United States Patent
Ben-Alexander

(10) Patent No.: US 10,621,537 B2
(45) Date of Patent: Apr. 14, 2020

(54) TERMINAL RESOURCES AND TRAFFIC FLOW MANAGEMENT

(71) Applicant: Eran Ben-Alexander, Ramat Gan (IL)

(72) Inventor: Eran Ben-Alexander, Ramat Gan (IL)

( * ) Notice: Subject to any disclaimer, the term of this patent is extended or adjusted under 35 U.S.C. 154(b) by 1428 days.

(21) Appl. No.: 14/368,036

(22) PCT Filed: Jan. 17, 2013

(86) PCT No.: PCT/IB2013/050445
§ 371 (c)(1),
(2) Date: Jun. 23, 2014

(87) PCT Pub. No.: WO2013/108211
PCT Pub. Date: Jul. 25, 2013

(65) Prior Publication Data
US 2015/0006430 A1  Jan. 1, 2015

(30) Foreign Application Priority Data

Jan. 17, 2012  (IL) .......................................... 217594

(51) Int. Cl.
*G06Q 10/08*  (2012.01)
*G06Q 50/28*  (2012.01)
(Continued)

(52) U.S. Cl.
CPC ....... *G06Q 10/083* (2013.01); *G06Q 10/0631* (2013.01); *G06Q 10/109* (2013.01); *G06Q 50/28* (2013.01)

(58) Field of Classification Search
CPC .................................................. G06Q 10/083
See application file for complete search history.

(56) References Cited

U.S. PATENT DOCUMENTS

| 2004/0044467 A1* | 3/2004 | Laird | G06Q 10/08 |
| | | | 701/516 |
| 2006/0011721 A1* | 1/2006 | Olsen, II | G06Q 10/06 |
| | | | 235/385 |

(Continued)

FOREIGN PATENT DOCUMENTS

| EP | 1452992 | 9/2004 |
| WO | 01/53991 | 7/2001 |

OTHER PUBLICATIONS

Microsoft Corporation, Microsoft Computer Dictionary, Fifth Edition, Microsoft Press, 2002, front cover, title page, copyright pages, p. 346, and p. 448.*

(Continued)

*Primary Examiner* — Nathan Erb
(74) *Attorney, Agent, or Firm* — The Law Office of Joseph L. Felber

(57) ABSTRACT

A method of traffic flow management at a terminal is described which comprises establishing a remotely accessible database containing a schedule of time-slots available for delivering or picking-up containers from a terminal with a truck. The schedule is accessible to trucking operator who can modify the schedule to mark individual time-slots as reserved. Once a time-slot is reserved, it is identified as such so that the time-slot ceases to be available to other trucking operators. The database also stores contact data to enable messages relating to a reserved time-slots be sent to a truck driver.

22 Claims, 7 Drawing Sheets

(51) Int. Cl.
 *G06Q 10/10* (2012.01)
 *G06Q 10/06* (2012.01)

(56) References Cited

U.S. PATENT DOCUMENTS

| | | | |
|---|---|---|---|
| 2006/0165064 A1* | 7/2006 | Brown | H04L 29/06027 370/352 |
| 2006/0251498 A1* | 11/2006 | Buzzoni | B65G 63/004 414/139.9 |
| 2007/0106725 A1* | 5/2007 | Starr | G06Q 10/109 709/204 |
| 2008/0010105 A1 | 1/2008 | Rose et al. | |
| 2008/0066080 A1* | 3/2008 | Campbell | G06F 17/3089 719/314 |
| 2008/0215385 A1 | 9/2008 | Veitch | |
| 2009/0106036 A1* | 4/2009 | Tamura | G06Q 10/109 705/305 |
| 2011/0270640 A1* | 11/2011 | Young | G06Q 10/0631 705/7.12 |
| 2013/0116865 A1* | 5/2013 | Cooper | B61L 17/00 701/20 |

OTHER PUBLICATIONS

Wikipedia, "Module," www.wikipedia.org, retrieved on Nov. 19, 2019.*
Wikipedia, "Search result page For remote communication device," www.wikipedia.org, retrieved on Nov. 19, 2019.*
Dougherty, Patrick Shane, Evaluating the Impact of Gate Strategies on a Container Terminal's Roadside Network Using Microsimulation: The Port Newark/Elizabeth Case Study, Rutgers the State University of New Jersey, New Brunswick, New Jersey, Oct. 2010.*
International Search Report and Written Opinion for International Application PCT/IB2013/050445, dated Jun. 4, 2013.
Maguire et al., "Relieving Congestion at Intermodal Marine Container Terminals: Review of Tactical/Operational Strategies," Transportation Research Forum, 51st Annual Transportation Research Forum, Arlington, VA, USA, Mar. 11-13, 2010.

* cited by examiner

Time-Slot Reservation Login

Trucking Operator ID _____ 46

Password _____ 48

Login

FIGURE 3A

Task Menu

Select one:

View available time-slots _____ 50

Edit existing reservation number _____ 52

Cancel existing reservation _____ 54

Logout

FIGURE 3B

Time-Slot Reservation

| | | |
|---|---|---|
| Time Slot reservation number | 123456789 | 62 |
| date | Tuesday 7 June | 64 |
| commencemant | 10:20 | 66 |
| select: | import / export | 68 |
| Trucking Operator Reference | _____ | 70 |
| Delivery Order/Booking Nr. | _____ | 72 |
| Shipping Line | _____ | 74 |
| Vessel Name | _____ | 76 |
| Voyage Nr. | _____ | 78 |
| Container Type: | _____ | 80 |
| Container Nr. | _____ | 82 |
| Truck License Nr. | _____ | 84 |
| Driver Contact data | _____ | 86 |
| Driver Identity | _____ | 88 |
| Consignee / Shipper name | _____ | 90 |
| Delivery / Pick-up location | _____ | 92 |
| Edit warning schedule | No / Yes | 94 |
| Reserve "drive full" | No / Yes   enter details now? | 96 |
| Reserve "Two Move" | No / Yes   enter details now? | 98 |
| | Finalize Reservation | 100 |

FIGURE 3D

Warning Message Schedule

Time Slot reservation number    123456789
                date..........................Tuesday 7 June
                commencemant................10:20

Warning Message 1 (mandatory evening before)  16:00 on Monday 6 June  102a
Warning Message 2 (mandatory - 6 hours)       04:20 on tuesday 7 June 102b
Warning Message 3 (mandatory - 15 min)        10:05 on tuesday 7 June 102c add warning message  _____   104

Finalize Warning Message Schedule            106

FIGURE 3E

Supplementary Time-Slot Reservation

| | | |
|---|---|---|
| Time Slot reservation number | 123456780 | 62 |
| date | Tuesday 7 June | 64 |
| commencemant | 10:40 | 66 |
| Type | Two-moves export | 108 |
| related to time-slot | 123456789 | 110a |
| type | export | 110b |
| date | Tuesday 7 June | 110c |
| commencement | 10:20 | 110d |
| Select: | ~~import~~ / export | 68 |
| Truck Operator Reference | | 70 |
| Delivery Order/Booking Nr. | | 72 |
| Shipping Line | | 74 |
| Vessel Name | | 76 |
| Voyage Nr. | | 78 |
| Container Type: | 20' / ~~40'~~ | 80 |
| Container Nr. | | 82 |
| Truck License Nr. | 22222 | 84 |
| Driver Contact data | 11111 | 86 |
| Driver Identity | John Smith | 88 |
| Consignee / Shipper name | | 90 |
| Delivery / pick-up location | | 92 |
| Edit warning schedule | No / Yes | 94 |
| Reserve "drive full" | No / Yes    enter details now? | 96 |
| Reserve "Two Move" | No / Yes    enter details now? | 98 |
| Finalize Reservation | | 100 |

FIGURE 3F

Supplementary Time-Slot Reservation

| | | |
|---|---|---|
| Time Slot reservation number | 123456785 | 62 |
| date...................................... | Tuesday 7 June | 64 |
| commencemant................. | 11:00 | 66 |
| Type | Drive full import | 108 |
| related to time-slot | 123456789 | 110a |
| type | export | 110b |
| date............... | Tuesday 7 June | 110c |
| commencement....10:20 | | 110d |
| related to time-slot | 123456801 | 112a |
| type | export | 112b |
| date............... | Tuesday 7 June | 112c |
| commencement....10:40 | | 112d |
| Select: | import / ~~export~~ | 68 |
| Truck Operator Reference | | 70 |
| Delivery Order/Booking Nr. | | 72 |
| Shipping Line | | 74 |
| Vessel Name | | 76 |
| Voyage Nr. | | 78 |
| Container Type: | 20' / 40' | 80 |
| Container Nr. | | 82 |
| Truck License Nr. | 22222 | 84 |
| Driver Contact data | 11111 | 86 |
| Driver Identity | John Smith | 88 |
| Consignee / Shipper name | | 90 |
| Delivery / pick-up location | | 92 |
| Edit warning schedule | No / Yes | 94 |
| Reserve "drive full" | No / Yes    enter details now? | 96 |
| Reserve "Two Move" | No / Yes    enter details now? | 98 |
| | Finalize Reservation | 100 |

FIGURE 3G

TERMINAL RESOURCES AND TRAFFIC FLOW MANAGEMENT

RELATED APPLICATION

The present application gains priority from Israel Patent Application IL 217594 filed 17 Jan. 2012.

FIELD AND BACKGROUND OF THE INVENTION

The invention relates to the field of resource management, and more particularly, but not exclusively, to methods and devices for management of resources and of traffic flow related to the transfer of goods, especially containerised goods, by truck, to and from a terminal, such as a shipping terminal.

The commercial transport of goods is typically performed using a transport mode such as via road (typically with trucks, especially semi-trailer trucks), via rail (with trains), via air (with aircraft), and via sea (especially with ships, but also with barges and river boats).

During transport, goods are typically packed in standardized shipping containers (20' and 40' containers) allowing simple and efficient handling using standardized loading equipment such as overhead and gantry cranes onto and off of suitably-configured vehicles, e.g., standardized flatbed rail cars, standardized semi-trailers for towing by a truck, and container ships.

The long-distance transport of a full container between a source and a destination is typically mulitmodal, that is to say, at least once during the journey from the source to the destination, the container is transferred from one transport mode to a different transport mode.

Transloading, the process of transferring a full container from one transport mode to another, typically occurs at a terminal which is an interface between two transportation modes: an outwards large-scale mode (e.g., vessels such as aircraft, trains and ships all of which are referred to herein as vessels) and an inwards small-scale mode (road-vehicles, usually a flatbed semitrailer towed by a tractor unit (together called a semitrailer), but also other road vehicles, for example, a towed flatbed full-trailer or a rigid flatbed truck, for convenience herein collectively referred to as "trucks").

As depicted in FIG. 1, a prior art terminal 10 constitutes an intersection between two streams, a large-scale transport stream 12 for transport of containers using an outward large-scale mode of transportation, and a small-scale transport stream 14 for transport of containers using an inward small-scale mode of transportation, with terminal 10 operating to transfer full containers between the two streams. For clarity, the discussion below will relate to terminal 10 as a road-sea terminal where the transportation mode of the large-scale transport stream 12 comprises vessels (ships) 16 and that of the small-scale transport stream 14 comprises trucks 18.

Due to constraints of the physical size of a terminal such as terminal 10, as well as in order to reduce operating costs, terminals have a limited number of resources, such as space, roads, working hours, forklifts, container-cranes, and terminal vehicles and crews that are used to move the full containers in the terminal, including to shift containers from place to place, to lift containers off and on terminal vehicles, to service vessels 16 by lifting full containers off and onto a vessel 16, and to service trucks 18 by lifting full containers off and onto a truck 18. It is appreciated that terminal vehicles are similar or identical to road vehicles, but dedicated for use only within the confines of the terminal.

In the illustrated terminal 10, there are three stacks of full containers:

an inbound stack 20 of full containers destined for import, that must pass various procedures such as inspection and/or customs procedures (including payment of taxes and excises) and then loaded onto trucks 18 for removal from terminal 10, each to a final destination in accordance with the instructions of a respective consignee (the entity importing a full container by vessel through a terminal);

an outbound stack 22 of full containers destined for export that, were brought to terminal 10 by trucks 18 and are to be lifted onto a vessel 16 after concluding customs procedures and/or inspection; and a transit stack 24 of full containers for transshipment, that were brought to terminal 10 by a vessel 16, lifted off the vessel for temporary storage in transit stack 24, and are to be lifted on to a different vessel 16 passing only "in bond" customs procedures.

In this context, it is important that in some terminals one or more of the three stacks may be made up of a number of discrete sub-stacks at substantially different locations in the terminal.

Large-Scale Transport Stream

A vessel 16a docks at the waterline of terminal 10.

Terminal resources are used to lift full containers destined for import off vessel 16a to inbound stack 20 and also to lift full containers destined for transshipment off vessel 16a to transit stack 24.

Subsequently, and sometimes concurrently, terminal resources are used to lift full containers destined for export onto vessel 16a from outbound stack 22 and from transit stack 24.

Small-Scale Transport Stream

Herein, in the context of a small-scale transport stream, the term "export" refers to bringing of a full container from a location of a shipper (the entity exporting a full container by vessel from a terminal) to a terminal. For export, a truck 18 is loaded with a full container at a location of a shipper, passes into terminal 10 through a lane 26 of a gate 28, and stops in the vicinity of outbound stack 22. The full container is unloaded from the truck by the terminal resources and lifted on outbound stack 22. The now-unladen truck 18 leaves terminal 10 through exit 32.

Herein, in the context of a small-scale transport stream, the term "import" refers to delivering of a full container from a terminal to a location of a consignee. For import, an unladen truck 18 passes into terminal 10 through a lane 26 of a gate 28 and stops in the vicinity of inbound stack 20. The appropriate full container is lifted off inbound stack 20 and loaded onto the truck 18 by the terminal resources. The truck 18 leaves terminal 10 through exit 32 laden with the full container, and typically transports the container to the consignee.

Passage of trucks 18 into terminal 10 is through gates 28: trucks 18 wait in one of multiple queues 30 associated with one of lanes 26 and are allowed to pass into terminal 10 on a first-in first-out (FIFO) basis. The rate of passage of trucks 18 entering terminal 10 is determined by the terminal resources available to service the trucks at any given time, and is dependent on working days and working hours.

The quality of a terminal such as terminal 10 is typically measured by the ability to service a vessel 16 of large-scale transport stream 12 on time. In the case of a sea terminal, this means minimizing the turn-around time required to unload full containers destined for import from a vessel 16 and to load full containers destined for export onto the vessel. Accordingly, when a vessel 16 is at a terminal 10, maximal terminal resources are dedicated to servicing the vessel at the expense of servicing trucks. The terminal operator continuously monitors the availability of terminal resources, and allows trucks to enter the terminal only when terminal resources are available. If the available terminal resources are reduced, for example, by a shortage of personnel or by a mechanical fault, the rate of entry of trucks into the terminal is reduced or suspended.

It is the responsibility of the shipper (the entity exporting a full container by vessel from a terminal) to ensure that a full container, destined for export onboard a given vessel and voyage number, is in outbound stack 22 prior to a specified cut-off time: the departure of a specified vessel having a specified voyage number is not delayed for a container to be brought to stack 22. As detailed hereinbelow, this is made difficult by the fact that a given full container is allowed to be stored in outbound stack 22 for only a short time and the date of docking of a vessel is known only 2-3 days before docking.

Similarly, it is the responsibility of the consignee (the entity importing a full container by vessel through a terminal) to ensure that a full container destined to be imported is stored on inbound stack 20 for as short a time as possible to avoid taking up valuable space in the terminal.

Import

About 2-4 days before a vessel 16a docks carrying a specific full container destined for import, the customs broker assigned by the consignee receives a "notice of arrival" notifying of the imminent arrival of vessel 16a. After vessel 16a docks, the full container is lifted-off, or unloaded from, vessel 16a and placed on inbound stack 20. The customs broker clears the full container through customs and provides the consignee with a delivery order. In some instances, such as in terminals in the United States, the custom procedure begins as soon as "notice of arrival" is received (e.g., 2-4 days prior to docking) to save valuable time so that the customs procedure typically ends before the vessel docks at the terminal.

The full container must be picked-up from inbound stack 20 and removed from terminal 10 within a 4 day period from unloading, or "touch down", of the container, that is to say prior to the last free day for pick up, to avoid payment of heavy fines. The consignee coordinates with a trucking operator (the operator of a truck or fleet of trucks) to pick-up the full container from stack 20 (preferably as soon as possible), preferably prior to the last free day for pick up, and to deliver the full container to a designated location, for example a warehouse of the consignee, preferably at a time which is convenient for the consignee.

To pick-up the full container, a truck driver of the trucking operator receives a delivery order from the customs broker of the consignee and arrives with an unladen truck 18 (typically a semitrailer truck, although in some terminals just a tractor unit) to wait in a queue 30 to enter terminal 10, typically on a day prior to the last free day for pick up. As passage of a truck 18 into terminal 10 is on the basis of first-in first-out of a queue 30, the truck driver often prefers to arrive early (typically well-before terminal 10 opens for operation) and wait in a queue 30, typically for many hours, e.g., 3-4 hours. When terminal 10 opens and servicing of trucks 18 begins, each truck 18, in turn, enters terminal 10, if necessary attaches a semitrailer, and stops proximal to a correct part of inbound stack 20 in accordance with the delivery order. The correct full container is then lifted off inbound stack 20 and loaded onto truck 18 using terminal resources. The now-laden truck 18 exits terminal 10 via exit 32.

In some terminals, a trucking operator is able to contact the terminal operator to select a time-window (typically having a duration of about 4 hours) on a designated day, within the 4-day period prior to the last free day for pick up, to pick-up the full container. Such selection of a time-window allows some for better distribution of arrivals of trucks 18 at a queue 30, but in practice, truck drivers must still wait many hours in a queue such as queue 30 to pick-up the full container. For example, if a time-window for a given truck driver is 8:00 AM-11:59 AM on a given day, the truck driver may arrive at a queue 30 with a truck 18 at about 3:00 AM to be amongst the first in the queue.

Export

Based on a shipping scheduled published by the terminal operator or shipping company, a shipper selects a specific vessel and voyage for exporting a full container to some destination weeks prior to the specific vessel docking at the terminal, and requests that a booking agent book a place on the vessel for the full container. The booking agent books the place on the container, and provides the shipper with a booking number.

Three to five working days prior to the actual docking of a vessel 16 (that is typically close to, but not necessarily identical with, the scheduled date for docking at the time the booking was made) the booking agent informs the shipper of a cut-off time: a time and a date before which the full container must be found on outbound stack 24 in order to be loaded onto vessel 16. The shipping company makes an empty container, stored in a container depot, available to the shipper.

The shipper coordinates with a trucking operator to bring the empty container from a container depot to a designated location (for example a warehouse of the shipper) for stuffing (placing of the goods for shipping in the empty container) preferably at a time which is convenient for the shipper, and then deliver the full container to the terminal prior to the cut-off time.

On the agreed upon day, the truck driver picks up the empty container from the container depot and arrives at a designated location. At the designated location, the shipper stuffs the empty container with the goods to be transported within an agreed upon and limited time, typically no more than 2 hours.

Once the container is stuffed with the goods, the doors of containers are sealed and the shipper contacts the customs broker to prepare all the required export documents for shipment of the container.

When the container-stuffing is complete and the customs broker properly advised, the truck driver drives the truck 18, laden with the full container, to terminal 10 to wait in a queue 30 at one of the lanes 26 of a gate 28. When its turn comes, truck 18 enters terminal 10 and stops proximal to a correct part of outbound stack 22 in accordance with the export documents. Terminal resources are then used to unload the full container from truck 18 and to lift the full container onto outbound stack 22. The now-unladen truck 18 exits terminal 10 via exit 32.

In some terminals, a trucking operator is able to contact the terminal operator in advance (e.g. prior to stuffing of container by the shipper) to select a time-window (typically of about 4 hours) on a designated day during the 4-day period prior to the cut-off time, for delivery of the full container to the terminal. Such selection of a time-window may reduce the average waiting time in a queue, but in practice truck drivers must still wait many hours in a queue for delivery of a full container for export.

The unique characteristics of transloading, especially as found at land-sea terminals, render efficient use of trucks impossible.

First, there is inherent uncertainty regarding the date when a specific vessel and voyage number will actually dock, and the date when the terminal will start servicing the vessel.

Consequently, there is an inherent uncertainty regarding the date when a given vessel will set sail, and due to the fact that full containers may not be stored for longer than 3-4 days in the terminal on an inbound or outbound stack. As a result, a truck cannot schedule its arrival at a terminal more than a few days in advance.

Additionally, a truck driver cannot independently schedule a time for delivery of a full container to a terminal or for pick-up of a full container from a terminal: the driver must coordinate the delivery or pick-up time with what is possible, and preferably convenient, for the customer, either a shipper or a consignee.

Additionally, vessels always have first priority for service at a terminal, meaning that any shortage of resources (e.g., caused by technical malfunction, shortage of personnel, or an incidentally higher than average number of vessels to be serviced) affects the rate of servicing of trucks.

Additionally, factors such as traffic, weather and technical delays make it difficult for a truck driver to accurately known how long it will take to arrive at a terminal from a location of origin, so the truck driver must always plan to arrive early rather than be later in a queue.

As a consequence, truck drivers expect to, and plan to, wait many hours in a queue to enter the terminal. Even in terminals that allow selection of time-windows, the time-windows are allocated only 1-4 days ahead of time, are very long (4 hours). Additionally, the time windows are typically queue-based, that is to say, many trucks are allocated the same time-slot and are still serviced on a first-in first out basis. As trucks enter a terminal on a first-in first-out basis, the terminal operator does not know the identity of the next truck to be serviced.

The result of all of the above is that use of trucks (small-scale transport stream 14) at a terminal is extremely inefficient. Truck drivers find themselves waiting in a queue for many hours. For example, a truck driver may need to arrive at a terminal at 05:00 AM to wait in a queue for the terminal to open at 07:00 AM. Such waiting in queue is a waste of trucks and of truck driver time, and causes pollution as the truck motor is left on, for example to power air-conditioning.

This inefficiency is compounded by the fact that terminals, consignee/shippers and truck drivers, do not work 24 hours a day. As a result, time coordination between these three entities is difficult, so time is wasted. Further, for safety reasons, the number of consecutive hours that a truck driver is legally permitted to drive is limited. As a result, long waiting times in a queue often lead the entire work day of a truck driver and of a truck to be wasted. Consequently, transport of a container that could take a few hours, often takes more than a day. For example, a truck driver may have waited in a queue for a number of hours and the terminal closes for the night. As the truck driver is loathe to lose the turn in the queue, the truck driver stays in the queue overnight. Alternately, the truck driver comes back the next day and charges the consignee or shipper additional "dry run charges" for the wasted time and fuel.

A driver delivering a full container released from customs to a location designated by a consignee must arrive at the terminal early to wait in a queue, but does not know when the full container will be loaded onto the truck, and thus does not know when the full container can be delivered at the designated location. The driver may leave the terminal with the full container during rush hour, causing further delays. The consignee may have to keep the designated location (e.g., warehouse) open and staffed beyond normal working hours, for an indeterminate time, to be able to accept and unload the full container, thereby increasing costs. The truck may arrive at the designated location during non-working hours and remain loaded and unusable until the next day. In such cases, consignees pay "pre-pull" charges as the loaded container must be safely stored overnight, for example in a guarded area.

A driver scheduled to deliver a full container for export from a location designated by a shipper (e.g., a warehouse) to a terminal must arrive at the location with an empty container at a time estimated to allow stuffing of the empty container, and must depart the designated location at a suitable time to reach the terminal when open, and when relevant, near a reserved time-window. This may lead to a driver wasting a day with a full container loaded on the truck rendering the truck unusable, or the shipper may have to keep the container stuffing location open and staffed beyond normal working hours to stuff the empty container, thereby increasing costs.

An additional challenge occurs when the capacity of a terminal is unexpectedly and severely disrupted as a result, for example, of inclement weather, sea conditions, or labour disputes. Such events may result in a terminal being totally or partially closed. When full capacity is resumed, previously scheduled trucks report en masse to the terminal, in an uncoordinated and chaotic fashion, leading to traffic congestion, pollution and waste of work time.

SUMMARY OF THE INVENTION

With a view to mitigating at least some of the foregoing problems, the present invention provides a method of traffic flow management at a terminal.

Thus, according to an aspect of some embodiments of the invention, there is provided a method of traffic flow management at a terminal, comprising: establishing a remotely-accessible reservation system comprising a database of time-slots for servicing trucks at a terminal;

populating an available time-slot portion of the database with a plurality of time-slots available for servicing trucks at the terminal, based on at least one criterion of the terminal;

reserving at least one of the plurality of time-slots for servicing of a specific the truck at the terminal, by removing the at least one of the plurality of time-slots from the available time-slot portion and by moving the at least one of the plurality of time-slots to an unavailable time-slot portion of the database; and in the database, associating with the at least one of the plurality of time slots information related to at least one of the specific truck and of a service to be performed on the specific truck.

In some embodiments, the service to be performed on the specific truck comprises at least one of:

lifting at least one full container off an inbound stack at the terminal and loading the at least one full container onto the specific truck; and unloading at least one full container from the specific truck and lifting the at least one full container onto an outbound stack at the terminal.

In some embodiments, the reserving comprises remotely reserving the at least one of the plurality of time-slots using a remote communication device.

In some embodiments, each of the plurality of time-slots is not more than about 30 minutes long. In some embodiments, each of the plurality of time-slots is not more than about 25 minutes long. In some embodiments, each of the plurality of time-slots is not more than about 20 minutes long.

In some embodiments, the method further comprises updating a user in communication with a specific truck of a change in the reserved at least one time-slot as information regarding the change becomes available.

In some embodiments, the method further comprises a user in communication with a specific truck notifying the database of a delay in arrival of the specific truck at the terminal, in real-time.

In some embodiments, the method further comprises updating in the database information associated with the at least one reserved time-slot.

In some embodiments, the method further comprises sending a driver of a specific truck at least one notification reminding the driver of an upcoming reserved time-slot. In some embodiments, the sending comprises sending the driver at least three the notifications reminding the driver of the upcoming reserved time-slot. In some embodiments, the sending comprises sending the at least one notification at a time indicated by a user associated with the specific truck, which time is stored in the database in association with the upcoming reserved time-slot.

According to an aspect of some embodiments of the invention, there is also provided a device for managing traffic flow at a terminal, comprising:
 a remotely-accessible reservation system comprising a database of time-slots for servicing trucks at a terminal, the database comprising an available time-slot portion and an unavailable time-slot portion;
 a database population module for populating the available time-slot portion with a plurality of time-slots available for servicing trucks at the terminal, based on at least one criterion of the terminal;
 a time-slot reservation module for reserving at least one of the plurality of time-slots for servicing of a specific the truck at the terminal, by removing the at least one of the plurality of time-slots from the available time-slot portion and by moving the at least one of the plurality of time-slots to the unavailable time-slot portion; and
 a database updating module for associating, in the database, the at least one of the plurality of reserved time slots with information related to at least one of the specific truck and of a service to be performed on the specific truck.

In some embodiments, the service to be performed on the specific truck comprises at least one of:
 lifting at least one full container off an inbound stack at the terminal and loading the at least one full container onto the specific truck; and
 unloading at least one full container from the specific truck and lifting the at least one full container onto an outbound stack at the terminal.

In some embodiments, the time-slot reservation module comprises a transceiver, for receiving communications sent from a remote communication device for remotely reserving the at least one of the plurality of time-slots.

In some embodiments, each of the plurality of time-slots is not more than about 30 minutes long. In some embodiments, each of the plurality of time-slots is not more than about 25 minutes long. In some embodiments, each of the plurality of time-slots is not more than about 20 minutes long.

In some embodiments, the device further comprises a communication module for updating a user in communication with the specific truck of a change in the reserved at least one time-slot as information regarding the change becomes available.

In some embodiments, the device, further comprises a receiver for receiving from a user in communication with the specific truck a notification of a delay in arrival of the specific truck at the terminal, in real-time.

In some embodiments, the device further comprises an information updating module for updating in the database information associated with the at least one reserved time-slot.

In some embodiments, the device further comprises a notification sending module for sending a driver of the specific truck at least one notification reminding the driver of an upcoming reserved time-slot.

In some embodiments, the notification sending module is configured for sending the driver at least three the notifications reminding the driver of the upcoming reserved time-slot.

In some embodiments, the notification sending module is configured for sending the at least one notification at a time indicated by a user associated with the specific truck, which time is stored in the database in association with the upcoming reserved time-slot.

Unless otherwise defined, all technical and scientific terms used herein have the same meaning as commonly understood by one of ordinary skill in the art to which the invention pertains. In case of conflict, the specification, including definitions, will control.

As used herein, the terms "comprising", "including", "having" and grammatical variants thereof are to be taken as specifying the stated features, integers, steps or components but do not preclude the addition of one or more additional features, integers, steps, components or groups thereof.

As used herein, the indefinite articles "a" and "an" mean "at least one" or "one or more" unless the context clearly dictates otherwise.

As used herein, when a numerical value is preceded by the term "about", the term "about" is intended to indicate +/−10%.

As detailed hereinbelow, embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, as detailed hereinbelow in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE DRAWINGS

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale. In the Figures:

FIGS. 3A-3G depict pages used for interaction between a trucking operator and an embodiment of a reservation system as described herein.

DESCRIPTION OF SOME EMBODIMENTS OF THE INVENTION

Figure 1:
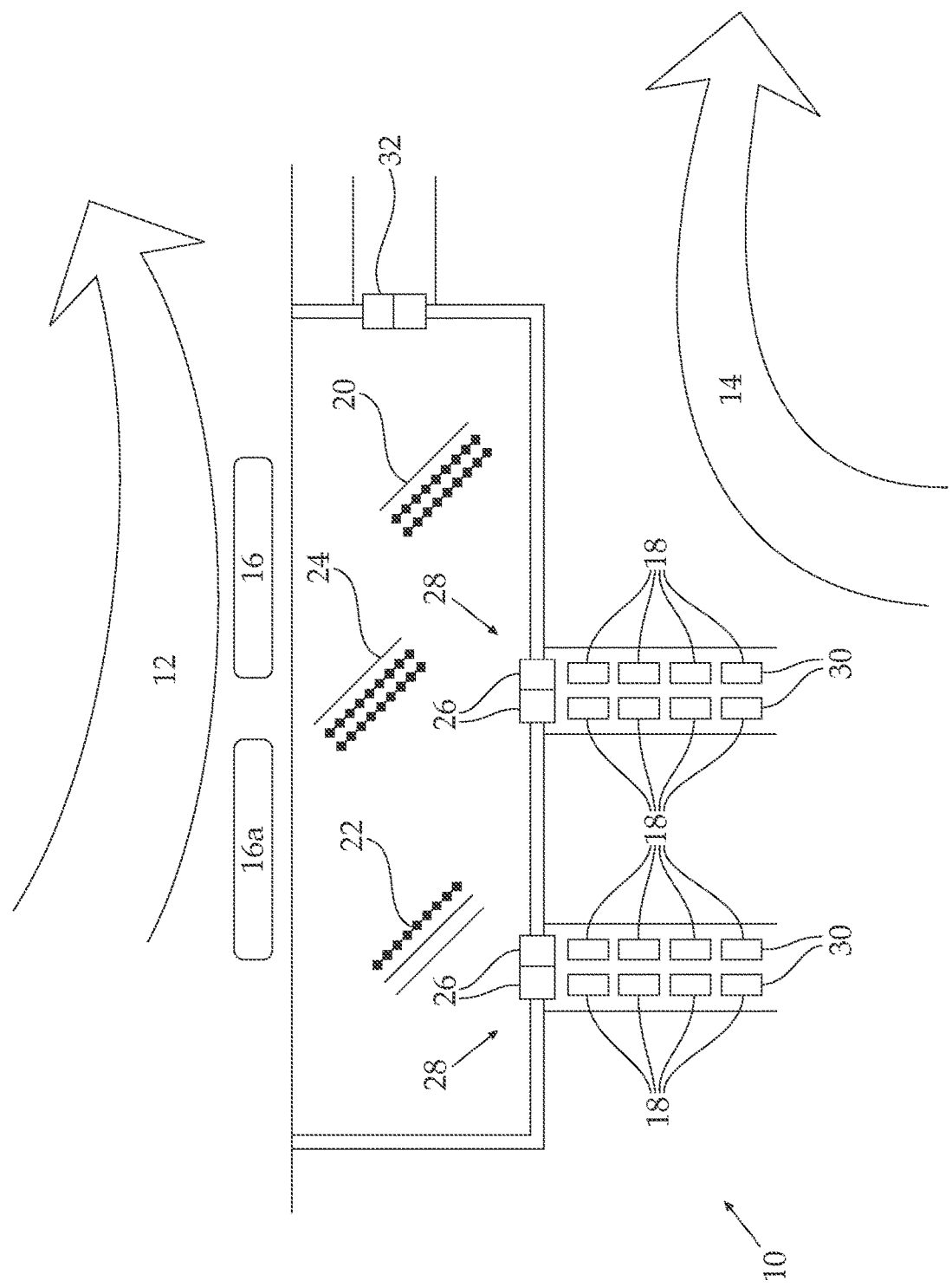
FIG. 1 (prior art) is a schematic representation of a road-sea terminal at which full container are loaded and unloaded from ships constituting a large scale transport stream in a seaport side and brought to or removed from the seaport side from the land side by trucks constituting a small scale transport stream.

With a view to mitigating at least some of the challenges of goods transport at a terminal as described in the introduction hereinabove, the present invention provides a method of traffic flow management in and around a terminal.

The principles, uses and implementations of the teachings herein may be better understood with reference to the accompanying description and figures. Upon perusal of the description and figures present herein, one skilled in the art is able to implement the invention without undue effort or experimentation. In the figures, like reference numerals refer to like parts throughout.

Before explaining at least one embodiment in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As discussed above, a terminal functions as an interface at which objects (full containers) are transferred between two streams, the large-scale transport stream of vessels and the small-scale transport stream of trucks. Existing prior art terminals can be considered as a device for effecting the transfer of the full containers between two streams that minimizes the delaying effects of the interface on the large-scale stream by rendering the small-scale stream extremely inefficient.

Herein is disclosed a method of operating an interface (the terminal) between the large-scale and small-scale transport streams as well as devices for implementing the method, the method being a method of traffic flow management to a terminal, that increases the efficiency of the small-scale transport stream without adversely affecting the large-scale stream, in some embodiments leading to better service and improved usage of terminal resources.

According to an aspect of some embodiments of the invention there is provided a method of traffic flow management at a terminal (e.g., a land-sea terminal), which comprises establishing a remotely-accessible reservation system comprising a database including a schedule of time-slots available for servicing of a plurality of trucks at the terminal, for lifting full containers off an inbound stack to load onto the trucks and for unloading full containers from the trucks and lifting the full containers onto an outbound stack.

The remotely-accessible reservation system is remotely-accessible to trucking operators wishing to reserve a time-slot for a truck to be serviced at the terminal, that is to say, to reserve a time-slot to deliver a full container from a location of a shipper to the terminal or to reserve a time-slot to pick-up a full container from the terminal for delivery to a location of a consignee.

The remotely-accessible reservation system is also remotely-accessible to truck drivers allowing receiving (and in some embodiments, sending) communications about a reserved time-slot.

Unlike the time-windows of a few hours duration known in the field of terminal traffic-flow management, time-slots as used herein are typically no longer than 30 minutes, preferably no longer than 20 minutes, more preferably between 10 and 15 minutes long.

As is discussed in greater detail hereinbelow, according to some embodiments of the teachings herein a trucking operator needing to deliver a container to or from the terminal reserves a specific time-slot on a specific day in coordination with the customer (the shipper or consignee). A truck driver is then assured of having a relatively well defined time-slot. A truck driver does not need to arrive early and waste time waiting in a first-in first-out queue to enter the terminal for service, but can plan arrival at the terminal close to the time-slot. In some embodiments, delays in providing service caused by the terminal or by late arrival of a truck are compensated for interactively in real-time.

By enabling coordinated scheduling and rescheduling of available time-slots, embodiments of the teachings herein allow relatively efficient usage of the available resources at a terminal and thereby often reduce the turnaround time for each vessel. At the same time, some embodiments of the teachings herein reduce the amount of time trucks and drivers have to wait idly for a turn to enter a terminal for service, thereby reducing traffic congestion, avoiding unnecessary fuel wastage and atmospheric pollution, and enabling drivers to better control their work time.

Reservation System and Database

The reservation system and the database can be implemented using any suitable software (including database software) running on any suitable hardware, typically a computer or server, especially an Internet-accessible server, all with which a person having ordinary skill in the art is familiar. The reservation system and database are accessible to the terminal operator and to trucking operators wishing to send a truck for servicing at the terminal in the usual way, for example through the Internet. In some embodiments, existing equipment and technologies are preferably used.

For example the database is stored on a server that is accessible via the Internet using an Internet browser or a cloud, such as iCloud®.

The database includes a schedule of time-slots for servicing trucks at the terminal, that is to say, for lifting a full container off an inbound stack to load onto a truck and/or for unloading a full container from a truck and lifting the container onto an outbound stack. The number of time-slots at a given time of a given day is calculated in the usual way (by the terminal operator) and is a function of the absolute number of terminal assets, maintenance schedules and factors such as the date and the time of day (e.g., holidays, weekends, seasonal vacations and the like).

Terminal Operator Access of Reservation System

Typically, the reservation system and database are configured to allow the terminal operator to allocate resources for servicing vessels. The terminal operator, who is be aware of the movements of all the vessels accessing the terminal well in advance (2-4 days) of the expected time of arrival, including the size of vessels, the number of containers on board vessels to be off-loaded, and the number of containers to be on-loaded onto vessels. Based on this knowledge and a knowledge of the size of the vessel and the available assets (cranes, crews, etc), the terminal operator will be well placed to calculate and reserve the assets that are needed for servicing the vessels docking at the terminal, prior to allocating resources for servicing trucks.

During use, a terminal operator accesses the database and, with reference to a listing of vessel docking and departure times, allocates resources to service vessels scheduled to dock at the terminal in the usual way known to a person having ordinary skill the art. For example, the terminal operator allocates resources to lift containers off of a vessel and onto an inbound or transit stack or to lift containers off of an outbound or transit stack onto the vessel. The reservation system is configured so that allocating terminal resources to service vessels renders time-slots unavailable for servicing trucks.

Terminal resources not allocated for servicing vessels are available for servicing of trucks at the terminal. At any given time during a given day, the schedule may include no time-slots for servicing trucks (e.g., the terminal is closed, all assets are unavailable, for example because they are servicing vessels or undergoing maintenance), may include a single time-slot for servicing a single truck, or may include multiple time-slots for concurrently servicing multiple trucks.

In some embodiments, allocating resources for servicing vessels is expressed in terms of allocating time-slots for servicing vessels. In some embodiments, after resources are allocated for servicing vessels, the resources remaining for servicing trucks are expressed in terms of time-slots.

Trucking Operator Access of Reservation System

The reservation system and database are also configured to allow a trucking operator to reserve time-slots for servicing a truck. When a trucking operator desires to reserve a time-slot, the trucking operator accesses the database in the usual way, e.g., through the Internet with a computer, smartphone or such device, for example, by logging in through a Website using an own username and a password. The trucking operator is then presented with available time-slots, that is to say, time-slots that are currently available to be reserved for servicing of a truck. The available time-slots are presented in any suitable fashion, preferably in a way that is simple and intuitive to understand, for example as a calendar.

In some embodiments, the available time-slots are presented as a calendar where each day is divided into a series of time units from the terminal opening time to the terminal closing time labeled with a time-slot commencement time. Each such time unit is labeled to indicate the existence of time-slots available for reservations during the time unit. For example, time units that include no time-slots, for example because there are no assets available for servicing trucks or because the terminal is closed, are colored grey, time units that include no available time-slots, for example because all available time-slots have already been reserved, are colored red, and time units that include at least one available time-slot are colored green.

Reserving a Time-Slot

The reservation system is configured to allow a trucking operator accessing the database to modify the schedule to reserve an available time-slot for servicing of a truck. Specifically, the trucking operator requests that a specific available time-slot be reserved for servicing a truck, for example, by entering the required information using an input method such as a mouse, keyboard or touch screen. The reservation system receives the request and if the reservation system accepts the request, the time-slot is marked as being no longer available.

In some embodiments, reserving an available time-slot requires payment of a fee to discourage trucking operators from hamstering time-slots or reserving time-slots that are not actually intended for use. In some embodiments, the height of the fee for reserving an available time-slot varies with the popularity of the time-slot, which popularity is typically determined by past experience indicating which time-slots are usually reserved first.

Confirming a Reserved Time-Slot

In some embodiments, the reservation system is configured to send the trucking operator a confirmation, preferably an immediate confirmation, that a reservation request is accepted. The confirmation is typically sent through the same interface that was used for reserving the time-slot, e.g., a Website, but may be sent using any other communication method, such as by voice mail, electronic mail, an SMS message, an instant messaging communication, or any type of text message. Such immediate confirmation allows a trucking operator to reserve a specific time-slot together with the customer (the shipper or consignee) and give the customer immediate confirmation that the time-slot is reserved.

Informing the Truck Driver

In some embodiments, the reservation system is also configured to send a message to a truck driver assigned to drive the truck for which a time-slot has been reserved, informing the truck drive of salient details of the time-slot. Preferably, the message is sent to the truck driver wirelessly, e.g., as an SMS message to a mobile telephone or as an email which the driver may access by a smartphone.

Entering Supplementary Information

In some embodiments, the reservation system is configured to accept and associate one or more pieces of supplementary information with a reserved time-slot. In some embodiments, reservation of a time-slot is contingent on receipt of one or more of the supplementary information, e.g., from the trucking operator trying to reserve a time-slot. In some embodiments, one or more of the pieces of supplementary information may be received and associated with the reserved time-slot subsequent to reserving of the time-slot. Depending on the embodiments, supplementary information can include any useful information, for example one or more of driver identity, driver contact data (data enabling a message to be wirelessly sent from the reservation system to the truck driver e.g., a driver telephone number or email address), truck identifier (e.g., license plate number, wireless identifier such as RFID or active radio identifier), a delivery or export order identifier, a consignee/shipper identifier, a container type (20' or 40'), a container identifier, a shipping line, a vessel name and a voyage number. In some embodiments, the reservation system is configured so that the trucking operator enters (e.g., types in), and the reservation system accepts, at least some supplementary information during the reservation of a time-slot. In some embodiments, the reservation system is configured so at least some of the supplementary information is pre-stored in the reservation system and is made available to the database for association with a reserved time-slot, for example, by the trucking operator entering a numerical code or "pointing a cursor".

Drive Full Operation

A drive-full operation refers to a truck making a single trip to a terminal where the truck delivers a first full container from a shipper to a terminal, which container is lifted onto an outbound stack, and then is loaded with a second full container lifted off an inbound stack and onto the now-unladen truck for delivery to a consignee. In the art, a truck implementing a drive-full operation leaves the terminal after the first full container is unloaded and waits in the queue in the usual way to re-enter the terminal to load the second full container. Since waiting in a queue is time-consuming, drive-full operations are rarely implemented.

In some embodiments, the reservation system is configured to allow reservation of two time-slots to service a single truck, allowing implementation of a drive-full operation. In some such embodiments, a first time-slot is reserved for unloading a full container from the truck onto an outbound stack and a second, later, time-slot is reserved for loading a full container onto the truck from an inbound stack. In some embodiments, the reserved time-slots are contiguous. In some embodiments, especially when the time slots are contiguous, the truck is not required to exit the terminal between the two time-slots.

In some embodiments, reservation of two time-slots for drive-full operation is possible only if the identity of both full containers is known. In some instances such embodiments are less favored as these require the trucking operator to communicate, and coordinate, with both a shipper and a consignee at the same time.

In some embodiments, the reservation system is configured to allow reservation of a supplementary time-slot for a drive-full operation once a first time-slot has been reserved. A trucking operator reserves a first time-slot as described above and then contacts potential customers (shippers or consignees, as the case may be) to find a customer interested in utilizing a supplementary time-slot for a drive-full operation, contact that can potentially take minutes, hours or even a day. Once an interested customer is found, the trucking operator accesses the reservation system, and reserves an available time-slot as the supplementary time-slot, in some embodiments preferably a time-slot contiguous to the first time-slot.

In some embodiments, during reservation of a time-slot, there is an option to provisionally reserve a supplementary time-slot for a drive-full operation. In some embodiments, provisional reservation of a supplementary time-slot for a drive-full operation is for a limited time and contingent on the trucking operator subsequently identifying the additional container to be loaded or unloaded in the provisionally reserved supplementary time-slot, or confirming the reservation of the provisionally reserved supplementary time-slot. The reservation system receives the request for provisional reservation of a supplementary time-slot for a drive-full operation, and if the reservation system accepts the request, the supplementary time-slot is marked as being no longer available. If the provisional reservation is not confirmed (by the trucking operator) within the time limit, the supplementary time-slot is no longer reserved and is marked as being available. In some embodiments, provisionally reserving a supplementary time-slot for a drive-full operation requires payment of a fee to discourage trucking operators from reserving supplementary time-slots that are not actually used. In some such embodiments, the height of the fee is dependent on the popularity of the supplementary time-slot being reserved. In some embodiments, provisionally reserving a supplementary time-slot for a drive-full operation requires payment of a fee only if the trucking operator does not subsequently identify the container to be loaded or unloaded in the provisionally reserved time-slot. In some such embodiments, a trucking operator provisionally reserves a supplementary time-slot for a drive-full operation and then contacts potential customers (shippers or consignees, as the case may be) to find a customer interested in utilizing the time-slot.

Two-Moves Operation

Some embodiments of the teachings herein allow for implementation of a two-moves operation, where a truck is loaded with two 20' containers, each container destined for delivery to a different place. For example, a truck arrives at a terminal with a first full 20' container for lifting onto a first outbound stack and a second full 20' container for lifting onto a second outbound stack, the two containers from the same shipper or from two different shippers. Alternatively or additionally, at a terminal, an unladen truck is loaded with a first full 20' container lifted off a first inbound stack and a second full 20' container lifted off a second inbound stack, the two containers destined for the same consignee or for two different consignees.

In some embodiments, the reservation system is configured to allow reservation of two time-slots, to service a single truck allowing implementation of a two-moves operation. In some such embodiments, a first full 20' container is unloaded from or loaded onto the truck or in a first time slot and a second full 20' container is unloaded from or loaded onto the truck in a second time-slot. In some embodiments, the reserved time-slots are contiguous and the truck is not required to exit the terminal between the two time-slots.

In some embodiments, reservation of two time-slots for a two-moves operation is possible only if the identity of both full containers is known. In some instances such embodiments are less favored as these require the trucking operator to communicate with two shippers or with two consignees at the same time.

In some embodiments, the reservation system is configured to allow reservation of a supplementary time-slot for a two-moves operation once a first time-slot has been reserved. A trucking operator reserves a first time-slot and then contacts potential customers (shippers or consignees, as the case may be) to find a customer interested in utilizing the supplementary time-slot for a two-moves operation. Once an interested customer is found, the trucking operator accesses the reservation system, and reserves an available time-slot as the supplementary time-slot, in some embodiments preferably a time-slot contiguous to the first time-slot.

In some embodiments, during reservation of a time-slot, there is an option to provisionally reserve a supplementary time-slot for a two-moves operation. In some embodiments, a provisional reservation of a supplementary time-slot for a two-moves operation is for a limited time and contingent on the trucking operator subsequently identifying the additional container to be loaded or unloaded in the provisionally reserved supplementary time-slot or otherwise confirming the reservation of the provisionally reserved supplementary time-slot. The reservation system receives the request for provisional reservation of the supplementary time-slot for a two-moves operation, and if the reservation system accepts the request, the time-slot is marked as being no longer available. If the provisional reservation is not confirmed within the time limit, the time-slot is marked as being available. In some embodiments, provisionally reserving a supplementary time-slot for a two-moves operation requires payment of a fee to discourage trucking operators from reserving time-slots that are not actually used. In some such embodiments, the height of the fee is dependent on the popularity of the supplementary time-slot being reserved. In some embodiments, provisionally reserving a supplementary time-slot for a two-moves operation requires payment of a fee only if the trucking operator does not subsequently identify the container to be loaded or unloaded in the provisionally reserved time-slot. In some such embodiments, a trucking operator provisionally reserves a supplementary time-slot for two-moves and then contacts potential customers (shippers or consignees, as the case may be) to find a customer interested in utilizing the time-slot.

Warning Message Schedule

In some embodiments, the reservation system and/or database includes a warning message schedule associated with a reserved time-slot. The warning message schedule is a schedule of times prior to commencement of a specific time-slot at which warning messages are wirelessly transmitted to the assigned truck driver as reminders of the status of the time-slot. In some embodiments, the warning message schedule is fixed. In some embodiments, the reservation system is configured to allow a trucking operator to amend the warning message schedule, for example, by adding additional warning messages to a set of one or more predetermined warning messages, or for example, by removing or amending warning messages from a set of one or more predetermined warning messages.

For example, in some embodiments each reserved time-slot has an associated warning message schedule for transmission of three mandatory warning messages to be transmitted to the designated truck driver of the reserved time-slot, a first warning message 4 hours prior to commencement of the time-slot, a second warning message 1 hour prior to commencement of the time-slot and third warning message 15 minutes prior to commencement of the time-slot.

For example, in some embodiments each reserved time-slot has an associated warning message schedule that allows additional warning messages to be added to the warning message schedule.

Canceling a Reservation

In some embodiments, the reservation system is configured to allow a trucking operator to cancel reservation of a previously reserved time-slot. In some embodiments, such cancellation requires payment of a fee or fine in order to discourage trucking operators from hamstering time-slots or reserving time-slots that are not actually intended for use. In some embodiments, the height of such a fee or fine is dependent on the number of cancellations a trucking operator has made in a certain prescribed period of time.

Typically, once a reservation of a time-slot is cancelled, the reservation system is configured to mark the time-slot as available.

Modifying a Reservation

In some embodiments, the reservation system is configured to allow a trucking operator to modify information associated with a previously reserved time-slot, especially the supplementary information such as driver contact data (e.g., in case the driver of a specific truck is changed) or truck identification (e.g., in case a specific truck is replaced with another). In some embodiments, modification of some types of information requires payment of a fee or fine, to discourage trucking operator abuse of time-slot reservation. In some embodiments, the height of such a fee or fine is dependent on the number of modifications a trucking operator has made in a certain prescribed period of time.

Terminal Operator Modifying Reservation

A significant challenge in managing the traffic flow at a terminal is the inherent uncertainty of time schedules, as described hereinabove. The docking of vessels may be delayed, typically due to weather conditions, the amount of assets available for servicing vessels or vehicles may dramatically fall due to technical malfunctions and/or operator strikes, and the arrival time of vehicles such as trucks at a terminal is uncertain due to traffic conditions and possible technical malfunction.

In prior art methods of managing traffic flow at terminals such uncertainty is prevented from affecting the large-scale flow of vessels by forcing the small-scale flow of vehicles to be inefficient: the trucks are forced to waste time waiting in a first-in first-out queue for service at the terminal.

In some embodiments of the method described herein, such uncertainty is prevented from affecting the efficiency of a terminal with the use of dynamic rescheduling of time-slots. Specifically, when required, the time-slots are reallocated to trucks and the drivers informed of the rescheduling with a warning message. Such a warning message is preferably sent to a mobile communication device of the driver such as a portable telephone or smartphone, preferably automatically.

Situations that require rescheduling of time-slot reservations can be divided into two cases: large-scale schedule disruptions and small-scale schedule disruptions.

According to some embodiments of the teachings herein, advantage is taken of the reservation system and information stored therein in association with reserved time-slots to prevent terminal paralysis, to maintain at least some terminal capacity and to recover more quickly from a schedule disruption. Information which is particularly useful for these purposes includes one or more of the contact details of truck drivers and trucking operators, reserved time-slots, and information as to the reason for which a specific truck is to arrive at the terminal.

In some embodiments, when a schedule disruption occurs, a warning communication is sent to affected truck drivers and/or trucking operators to mitigate the effect of the disruption. In some embodiments, a terminal operator consults the reservation system and/or database for the required contact details and other necessary information and then contacts truck drivers and/or trucking operators with a warning message.

In some embodiments, the reservation system is configured to allow the terminal operator to send a specific warning message to some or all of the truck drivers and/or trucking operators having a reserved time-slot, preferably automatically. The sending of a message to a group of addressees whose contact data is stored in a database is well-known in the art.

In some embodiments, the reservation system is configured to receive messages wirelessly sent by truck drivers, for example, messages confirming that a truck driver has received a previously sent warning message or messages sent by a truck driver informing of an anticipated late arrival at the terminal. In some embodiments, the reservation system is configured to forward such received messages to a terminal operator. In some embodiments, the reservation system is configured to autonomously handle certain such messages received from a truck driver.

Large-Scale Schedule Disruptions

Large-scale schedule disruptions are typically due to unexpected loss of terminal capacity to service most, if not all, trucks and usually extend into a following work day or more. Such disruptions include labor strikes, labor slowdowns, mass illness of workers, and inclement weather. In the current state of the art, such large-scale schedule disruptions lead to havoc and paralysis of the terminal as the terminal operator does not know the identity of the truck drivers planning to arrive at the terminal and truck drivers are not able to receive credible information so prefer to arrive at the terminal in the hopes of being serviced. As a result, the environs of the terminal are blocked by traffic jams.

According to some embodiments, such large-scale disruptions are handled in three stages.

In some embodiments, in a first stage, the terminal operator identifies a large-scale disruption and warns the truck drivers and trucking operators that are expected to be affected (in practical terms all such who have a reserved time-slot), informing them of the expected disruption. In such a way, the truck drivers and trucking operators do not have to contend with uncertainty, for example, fed by inaccurate news reports or rumors. In some such instances, the warning message informs the affected truck drivers that the reserved time-slots are canceled for a certain time so that the truck drivers know that there is no reason to arrive at the terminal, and all time-slots must be scheduled anew as described above. As described above, in some embodiments, the reservation system is configured to send (automatically or under direction of the terminal operator) such a warning message to some or all of the truck drivers having a reserved time-slot. In preferred embodiments, the truck driver is not required to respond to the sent warning message.

In some embodiments, in a second stage, the terminal operator evaluates the situation and decides which, if any, trucks can be serviced despite the disruption, and in some embodiments, draws up a new schedule for servicing of trucks. Typically, the evaluation and decision are done manually with reference to the salient information stored in the reservation system and database, for example, onto which vessel a container is destined to be lifted.

Warning messages are then sent to the truck drivers as necessary: informing some truck drivers that the reserved time-slot is still available and not delayed; informing some truck drivers that the reserved time-slot has been delayed (e.g., by a certain amount of time), and informing some truck drivers that the reserved time-slot has been canceled until further notice. In such a way, access to the terminal is not blocked, the terminal not paralyzed and service can be provided to at least a few trucks selected based on rational criteria or prioritizing. As described above, in some embodiments, the reservation system is configured to send (automatically or under direction of the terminal operator) such different warning messages to some or all of the truck drivers having a reserved time-slot. In some such embodiments, confirmation of the message by a driver is not required. In some such embodiments, confirmation of the message by a driver is required.

In some embodiments, in a third stage, when the terminal operator has a better grasp of how many assets are available and the expected time at which full terminal capacity will be restored, the terminal operator "resets" the previously stored schedule in the usual way, allocating resources to service vessels and then informing trucking operators to access the reservation system and reserve time-slots in the usual way.

It is important to note that although in some preferred embodiments a large-scale disruption is handled serially in three stages, in some embodiments such a disruption is handled with only one of the stages above, with only two of the stages above (in any suitable order) or with all three stages (in any suitable order).

Small-Scale Schedule Disruptions

Small-scale disruptions are disruptions that typically have influence on a limited number of trucks and typically do not influence terminal activity for more than a day. In some instances a small-scale disruption is caused by a minor reduction of available terminal assets, for example, a worker falls ill or a crane malfunctions. In some instances a small-scale disruption is caused by a truck that cannot arrive at the terminal in time, for example, due to unexpectedly heavy traffic, inclement weather, or a technical malfunction.

In the prior art, small scale disruptions have no substantial effect on terminal operation. In the worst case, trucks wait in the queue longer than usual, but typically not-noticeably.

In some embodiments of the teachings herein, small-scale disruptions lead to rescheduling or delaying of time-slots, the fact of which is communicated to affected truck drivers.

For example, a small-scale disruption caused by a minor reduction of available terminal assets is noted by the terminal operator. Such disruption is typically handled by delaying (preferably automatically) servicing of all or most trucks by one or two time-slots, leading to a delay that may be mildly irritating but that is not substantial. Such delays can ultimately be absorbed by a little excess asset capacity, and if necessary by keeping the terminal open somewhat longer at the end of the day for servicing only specific trucks having time-slot reservations for that day. In some such embodiments, the truck drivers whose time-slots are rescheduled are informed of the rescheduling. In some embodiments, when the rescheduling is short (e.g., 15-30 minutes), the affected truck drivers are not informed. In some embodiments, the reservation system is configured to inform affected truck drivers automatically by sending an appropriate warning message to the truck driver. In some such embodiments, confirmation of the message by a driver is not required. In some such embodiments, confirmation of the message is required.

In some embodiments, a small scale disruption that leads to rescheduling of at least some of the reserved time-slots is initiated by a truck driver. For example, a truck driver with an originally reserved time-slot realizes that he or she is delayed and will be unable to reach the terminal in time for the originally reserved time-slot. The delayed driver communicates the fact of the delay to the reservation system together with an expected earliest arrival time. The delayed driver receives a new reserved time-slot based on the expected earliest arrival time.

A warning message is sent to other drivers having time-slots between the originally reserved time-slot and the newly reserved time-slot, informing them of the possibility to arrive at an earlier than scheduled time-slot. As it is advantageous to receive an earlier time-slot, substantially any driver who can arrive earlier will eagerly do so. Specifically, any driver who can arrive at the terminal to make use of any earlier time-slot sends a communication (e.g., text message)

to the terminal (e.g., to the reservation system) informing of the desire for an earlier time-slot and how much earlier he or she can arrive. In some embodiments, the warning message is sent to the drivers serially, that is to say, one driver at a time. In some embodiments, the rescheduling message is sent to the drivers in parallel, that is to say, multiple drivers at a time. Based on the communications received by the drivers, the terminal (in some embodiments, the reservation system) reallocates the time-slots between the originally reserved time-slot and the new reserved time-slot of the delayed driver.

In some embodiments, a delayed truck does not initiate a wholesale rearrangement of the reserved time-slots. Instead, succeeding trucks are allowed to enter the terminal for service, that is to say, the succeeding trucks are allowed to use an earlier-than-reserved time-slot. This continues until the originally delayed truck arrives at the terminal and receives the first following available time-slot so that the order of service at the terminal reverts back to the originally scheduled order. In some such embodiments, a delayed truck is fined, for example, a fine that rises with the length of the delay in arrival.

In some embodiments, when a driver informs that he or she is delayed and will arrive close to the closing time of the terminal, the terminal operator opts to keep the terminal open longer than usual for servicing the truck or opts to reserve an early time-slot the following morning for the delayed truck driver. Specifically, in some embodiments, a driver informs the terminal operator that he or she is en route but with a delay that makes it impossible to arrive before the closing of the terminal. The terminal operator can decide to keep the terminal open sufficiently late allowing servicing of the truck the same day. In such a case, the truck driver receives a warning message informing that the terminal will remain open later than usual and is therefore able to continue to the terminal for service on the same day. Alternatively, the terminal operator can decide to not wait for the truck and to close the terminal at the usual time, but assigns a first, or early, time-slot on the following day to the delayed truck. The driver can then make a rational choice as to where to stop for the night.

Entering the Terminal for Service

Figure 2:
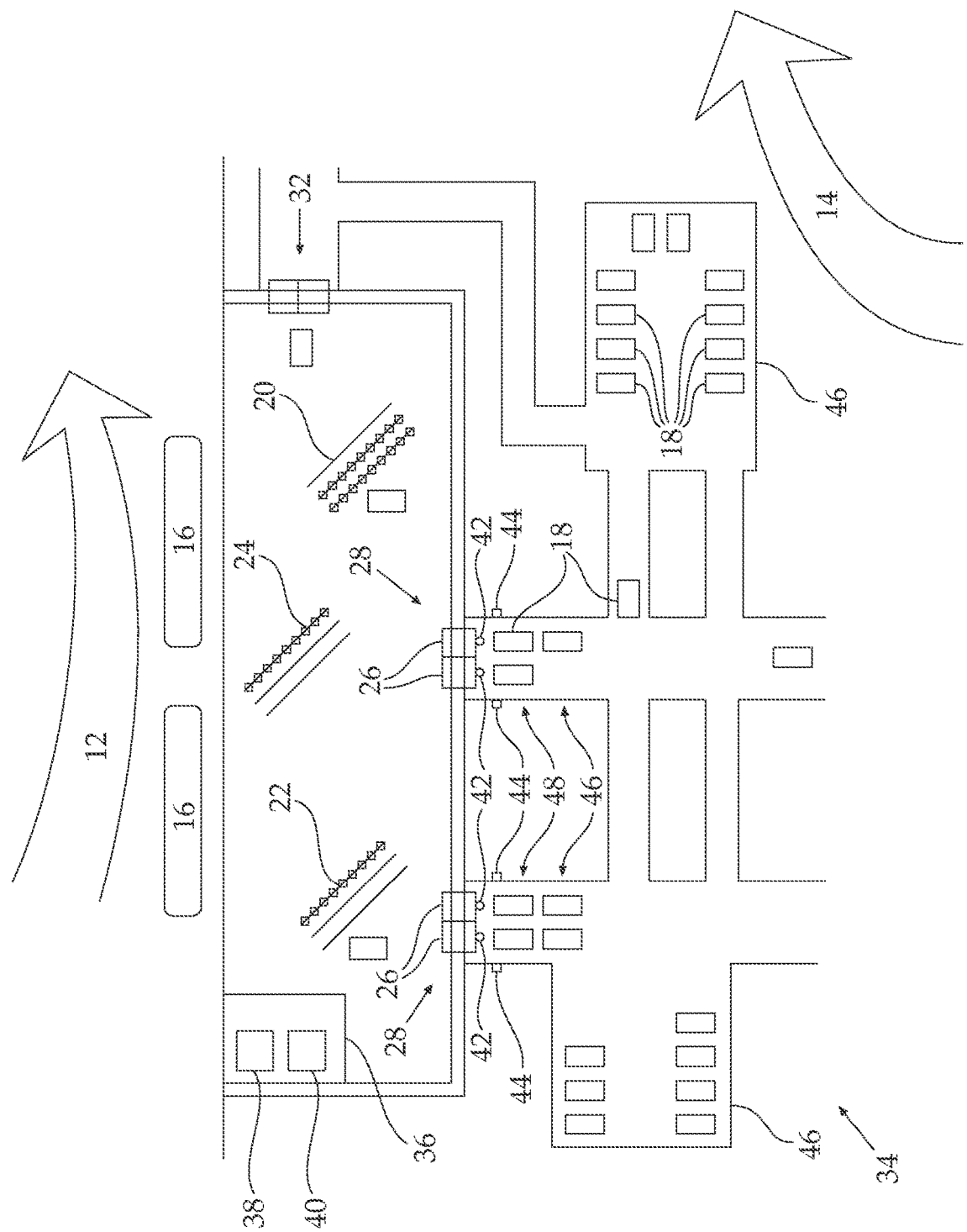
FIG. 2 is a schematic representation of an embodiment of road-sea terminal configured to implement the teachings herein at which full containers are loaded and unloaded from ships constituting a large scale transport stream in a seaport side and brought to or removed from the seaport side from the land side by trucks constituting a small scale transport stream.

Any suitable terminal may be used in implementing the teachings herein. That said, it is preferred that a terminal be physically configured for taking advantage of the teachings herein. An embodiment of a suitably configured terminal, terminal 34, is schematically depicted in FIG. 2.

As in the art, terminal 32 constitutes an intersection between a large-scale transport stream 12 (comprising vessels 16) and a small-scale transport stream 14 (comprising trucks 18, not all individually labeled in FIG. 2), terminal 34 operating to transfer full containers between the two streams. Terminal 34 includes three stacks of full containers: an inbound stack 20, an outbound stack 22 and a transit stack 24. Terminal 34 includes a terminal control center 36 housing control systems 38 and a reservation system 40 as described herein.

Trucks 18 enter terminal 34 through a lane 26 of a gate 28. Each one of lanes 26 is associated with an electronic signboard 42 and a truck-identifier 44. Each one of lanes 26 is also associated with a moveable physical barrier (not depicted) having two states: an open state allowing passage of a truck 18 therethrough and a closed state preventing passage of a truck 18 therethrough.

Each signboard 42 is associated with a specific lane 26 and is functionally associated with reservation system 40. Each signboard 42 is configured to receive from reservation system 40 an identifier of the next two trucks designated to enter terminal 34 through the associated lane 26, and to display the two received identifiers. Any suitable changeable signboard can be used, for example a signboard comprising a matrix of individually activatable lights as known in the art.

Each truck-identifier 44 is associated with a specific lane 26 and is functionally associated with terminal control system 38. Each truck-identifier 44 is configured to provide terminal control system 38 with the identity of the leading truck 18 in the respective lane 26. Any suitable truck-identifier can be used, for example a truck-identifier configured to read a truck number plate (ANPR—Automatic Number Plate Recognition) or to identify a tag, such as an active (radio transmitter) or passive (RFID) tag.

Reservation system 40 includes a database and is implemented as software running on an Internet-accessible server. Reservation system 40 is configured to wirelessly transmit messages to truck drivers using an Internet "chat" system or a telephony "SMS" using driver contact data stored in the database. Reservation system 40 is also configured to receive certain types of messages from truck drivers.

In the environs of terminal 34 are waiting areas 46 configured for parking of trucks 18 waiting for service in terminal 34 and allowing maintenance of easy access to lanes 26.

An embodiment of the method described herein to use a terminal, such as terminal 34 depicted in FIG. 2, is discussed with reference to FIG. 3.

Reserving a Time-Slot for Export by a Shipper

Based on a shipping schedule published by the terminal operator or shipping company, a shipper selects a specific vessel and voyage for exporting a full container, typically weeks prior to the date of the specific vessel docking at the terminal, and requests that a booking agent book a place on the vessel for the full container. The booking agent books the place and provides the shipper with a booking number.

Three to five working days prior to the actual docking of the specific vessel on which the place was booked, such as vessel 16 the booking agent informs the shipper of a cut-off time: a time and date before which the full container must be found on outbound stack 24. The shipping company makes an empty container stored in a container depot available to the shipper. It is appreciated that the actual docking date is typically close to, but not necessarily identical with, the scheduled date at the time the booking was made.

The shipper contacts a trucking operator and informs of the need for delivery of an empty container to a designated location for stuffing, preferably at a time which is convenient for the shipper, and then of delivery of the now full container to terminal 34 prior to the cut-off time.

Using the Internet, or any other suitable communication method, the trucking operator accesses a log-in page (FIG. 3A) of reservation system 40 via the website of terminal 34, entering a user-identification in field 46, which is typically the trucking operator's own username, and a password in field 48, e.g., using a keyboard or the like and then selects "login".

Figure 3C:
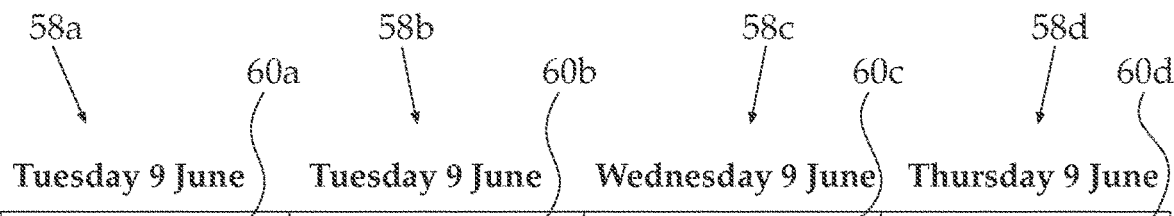

After verifying the entered user-identification and password, reservation system 40 displays a Task Menu page (FIG. 3B). The trucking operator selects to "view available time-slots" 50, e.g., with a pointing device such as a mouse, or by touching the appropriate region of a touch screen. Reservation system 40 displays the currently available time-slots page in the form of a 4-day calendar 56 (FIG. 3C). Each one of the four days represented in calendar 56 appears as a column 58*a*, 58*b*, 58*c* and 58*d* divided into 27 rows. Each of the 27 rows designates a 20-minute time unit of the working day of terminal 34 and is indicated by a start time and an ending time. Each of the 27 rows of each one of the columns 58 includes a subcolumn 60 indicating the number of time-slots available for servicing trucks during the corresponding time unit on the corresponding day. The number of available time-slots as indicated in subcolumns 60 is the total available time-slots for servicing trucks as calculated by the terminal operator as described above (total terminal assets less terminal assets not available or used for servicing vessels) and accounts for time-slots previously reserved by trucking operators. For example, if the terminal operator calculates that in a certain time unit 7 trucks can be serviced, or, 7 time-slots are available, and three of those time slots have already been reserved by trucking operators, subcolumn 60 will show 4 available slots in that time unit.

Preferably while in real-time contact with the shipper, such as during a voice dialogue (e.g., by telephone or Internet "voice chat") or through a text-dialogue (e.g., "chat", instant messaging, or "SMS"), the trucking operator and the shipper together discuss which of the available time-slots that is prior to the cut-off time, to reserve. The time-slot is selected based on factors such as availability of trucks and truck drivers, the time required to transport an empty container from the container depot to the designated location of the shipper, the time required for stuffing the container with goods preferably at a time convenient for the shipper, and the time required to deliver the full container to terminal 34, including accounting for traffic conditions at the prospective times. The trucking operator selects the agreed upon time-slot, e.g. by touching the appropriate region of a column 60 of a touch screen or by "pointing" with a mouse or the like.

Reservation system 40 accepts the selection, and checks to see whether the selected time-slot is still available, for example, a time-slot commencing at 10:20 on Tuesday 7 June. If the selected time-slot is not available, reservation system 40 returns a message that the selected time-slot is not available and displays calendar 56 again, where the available time-slots are listed in columns 60 are updated.

If the selected time-slot is available, reservation system 40 updates the database to indicate that the selected time-slot is now reserved and is therefore no longer available, and displays a Time-Slot Reservation page (FIG. 3D) as an immediate confirmation that the selected time-slot has been reserved, pending entry of the required information.

The Time-Slot Reservation page indicates a unique reservation number 62 of the time-slot as well as the date 64 and commencement time 66 of the time-slot.

Using the appropriate input device, the trucking operator enters the required information in the appropriate fields and selects the appropriate choices. Specifically in the depicted embodiment, the trucking operator indicates the type of the time-slot (import of a full container for a consignee or export of a full container for a shipper) 68, enters the internal reference number 70 of the time-slot used by the trucking operator, enters the booking order number 72 received from the shipping company, the shipping line 74, the vessel name 76 and voyage number 78 associated with the container. In the illustrated embodiment, the type of time slot is an export time slot, so the vessel information is information of the vessel onto which the full container is to be lifted. The trucking operator further indicates the type of container 80 (20' or 40'), the container number 82, the license number 84 of the truck destined to deliver the container to the terminal, the driver contact data 86, i.e., information for wirelessly contacting the driver of the truck e.g., telephone number or email address, the driver's identity (e.g., name and/or ID number) 88, the identity 90 of the shipper, and the designated location 92 from which the container is to be picked-up.

In 94, reservation system 40 provides the trucking operator with the choice to edit the default warning message schedule by indicating "yes" or to keep the default warning message schedule by indicating "no".

In 96, reservation system 40 provides the trucking operator with the choice to reserve a supplementary time-slot for a drive-full operation by selecting "yes" or not to reserve such a time-slot by selecting "no". If the trucking operator selects "yes", reservation system 40 provides the choice to enter details of the drive-full operation immediately (in case the trucking operator has these available) or to enter the details at a later date.

If the trucking operator indicates that the container type is 20' in field 80, in field 98 reservation system 40 provides the trucking operator with the choice to reserve a supplementary time-slot for a two-moves operation by selecting "yes" or not to reserve such a time-slot by selecting "no". If the trucking operator selects "yes", reservation system 40 provides the choice to enter details of the two-moves operation immediately (in case the trucking operator has these available) or to enter the details at a later date.

After all the required details are entered, the trucking operator indicates a desire to finalize the time-slot reservation by selecting field 100. Reservation system 40 stores the entered data in the database and displays the Task Menu page (FIG. 3B). In preferred embodiments, reservation system 40 subsequently sends the trucking operator (and in some embodiments, also the shipper entered in field 90 and/or to the truck driver contact data in field 86) an additional confirmation of the reservation, preferably including all the entered details.

If following reservation of a time-slot (e.g., within minutes, hours or days) the trucking operator wants to cancel a reserved time-slot, the trucking operator accesses reservation system 40 from the Login page (FIG. 3A) and in the Task Menu page (FIG. 3B) enters the time-slot reservation number from field 62 in field 54. Reservation system 40 displays a Time-Slot Cancellation page (not depicted) that requires some validation (e.g., entry of a password) to ensure that only authorized personnel cancel reservation of a time-slot. In some embodiments, reservation system 40 subsequently sends the trucking operator (and in some embodiments, also the shipper entered in field 90 and/or to the truck driver contact data in field 86) a confirmation of the cancellation.

If following reservation of a time-slot (e.g., within minutes, hours or days) the trucking operator wants to amend details of a reserved time-slot, the trucking operator accesses reservation system 40 from the Login page (FIG. 3A) and in the Task Menu page (FIG. 3B) enters the time-slot reservation number in field 52. Reservation system 40 displays the Time-Slot Reservation page (FIG. 3D) with the previously entered values displayed in the respective fields. Depending on the embodiment, the trucking operator has the option to amend some or all of the entered data, especially driver contact data in field 86, editing the warning schedule 94, reserving a drive-full operation in 96 or reserving a two-moves operation in 98.

Edit the Warning Message Field

When the trucking operator selects to edit the warning message schedule field 94 in the Time-Slot Reservation page (FIG. 3D) (whether during an initial reservation, or subsequently during amendment of details) reservation system 40 displays a Warning Message Schedule page (FIG. 3E) on which are listed the details of the reserved time-slot as well as a list of the default warning messages and any previously-entered additional warning messages. In FIG. 3E, warning message 102a is an absolute message, scheduled to be sent to the designated truck driver on a specific date, though the exact duration prior to commencement of the time-slot may vary, while warning messages 102b and 102c are relative messages, scheduled to be sent to the designated truck driver (from field 88) using the driver contact data (from field 86) at a time and date a certain amount of time prior to commencement of the time-slot. In field 104, the trucking operator can choose to add additional warning messages (absolute or relative). Additionally, if additional warning messages were previously added, the non-mandatory warning messages may be canceled by the trucking operator. When the desired warning message schedule is entered, the trucking operator selects field 106 to finalize the warning message schedule. Reservation system 40 stores the warning message schedule associated with the time-slot in the database, and displays Time-Slot Reservation page (FIG. 3D).

Reserving a Two-Moves Operation

As noted above, if during reservation of a time-slot the trucking operator indicates that the container type is 20' in field 80, then reservation system 40 provides the trucking operator with the choice, in field 98, to provisionally reserve a supplementary time-slot for a two-moves operation by selecting "yes" or not to reserve such a time-slot by selecting "no".

If the trucking operator selects "yes", indicating a desire to provisionally reserve a supplementary time-slot for a two-moves operation, reservation system 40 displays the Available Time-slots page (FIG. 3C). As described above, the trucking operator selects a suitable available time-slot, if such exists. A suitable supplementary time-slot for a two-moves operation is any earlier or later available time-slot, preferably as close as possible to the originally reserved time-slot, and most preferably a contiguous time-slot, i.e., a time-slot either immediately preceding or immediately following the already reserved time-slot. For example, if the already reserved time-slot is 10:20 on Tuesday 7 June, the trucking operator preferably selects either an earlier contiguous time-slot commencing at 10:00 on Tuesday 7 June, or a later contiguous time-slot commencing at 10:40 on the same date. Reservation system 40 stores the newly provisionally reserved supplementary time-slot associated with the originally reserved time-slot but with an own time-slot reservation number, and displays the time-slot Reservation page (FIG. 3D).

The reservation of the supplementary time-slot is provisional, and depending on the embodiments, may be valid for only a limited time.

To finalize the reservation of the provisionally reserved supplementary time-slot, the trucking operator must have the details of the second container to be shipped in the two-moves operation. In some instances, the trucking operator has the details available during the initial provisional reservation of the supplementary time-slot. In some instances, the trucking operator first provisionally reserves a supplementary time-slot, and then contacts potential customers, and finalizes the reservation only after a customer actually agrees to make use of the supplementary time-slot and provides the shipment details to the trucking operator.

To actually finalize the reservation of the provisionally reserved supplementary time-slot for a two-moves operation, whether during an initial reservation or subsequently during editing details of an existing reservation, the trucking operator indicates a desire to enter the relevant details in field 98 (FIG. 3D). Reservation system 40 displays a Supplementary Time-Slot Reservation page (FIG. 3F).

Supplementary Time-Slot Reservation page (FIG. 3F) resembles Time-Slot Reservation page (FIG. 3D) and includes, for the supplementary time-slot, the reservation number 62, the date 64, commencement time 66, and relationship to the originally-reserved time-slot 108 (two-moves or drive-full; import or export). Also displayed are the details of the originally reserved time-slot, including the reservation number 110a, the type of activity for which the originally reserved time-slot is reserved 110b (import for a consignee or export for a shipper), and the date 110c and commencement time 110d of the originally-reserved time-slot. Additional information that is identical to that of originally-reserved time-slot and is automatically filled-in includes the type of activity 68 (import or export) for which the supplementary time-slot is reserved, which is set to be identical to the type of activity of the originally-reserved time-slot, the type of container (necessarily 20') 80, the license number 84 of the truck destined to deliver the container to the terminal, driver contact data 86 and driver identity 88. Analogously to the described above, the trucking operator enters further required information in the appropriate fields and selects the appropriate choices. Specifically in the depicted embodiment, the trucking operator enters the internal reference number 70 of the supplementary time-slot as used by the trucking operator, the booking order number 72 received from the shipping company, the shipping line 74, the vessel name 76 and voyage number 78 onto which the full container is to be lifted, the container number 82, the identity of the shipper 90, and the customer location from which the container is to be picked-up 92.

Substantially as described above, reservation system 40 provides the trucking operator with the choice to edit the default warning message schedule in field 94.

Substantially as described above, in 96, reservation system 40 provides the trucking operator with the choice to reserve an additional supplementary time-slot for a drive-full operation.

After all the required details are entered, the trucking operator indicates a desire to finalize the provisional time-slot reservation by selecting field 100. Reservation system 40 stores the entered data in the database and displays the Task Menu page (FIG. 3B). In preferred embodiments, reservation system 40 subsequently sends the trucking operator (and in some embodiments, also the shipper entered in field 90 and/or to the truck driver contact data in field 86) an additional confirmation of the reservation, preferably including all the entered details.

Subsequent cancellation or amendment of the supplementary two-moves time-slot may be performed substantially as described above. In some embodiments, canceling an originally reserved time-slot leads to cancellation of related supplementary time-slots. In some embodiments a trucking operator may cancel the original reservation, and retain one or more reserved supplementary time-slot.

Reserving a Drive Full Operation

In a manner analogous to reservation of a supplementary time-slot for a two-moves operation as described above, reservation system 40 is configured to allow a trucking operator to optionally reserve a supplementary time-slot for a drive-full operation (deliver a full container to the terminal for a shipper and then, preferably without leaving the terminal, pick-up a full container for a consignee). Reservation of such a supplementary time-slot can be performed either directly from an original Time-Slot Reservation page (i.e., FIG. 3D) or from a Supplementary Time-Slot Reservation page (i.e., FIG. 3F), irrespective of a time-slot for a two-moves operation being previously reserved and/or finalized. Specifically, reservation system 40 provides the trucking operator with the choice, in field 96, to provisionally reserve a supplementary time-slot for a drive-full operation by selecting "yes" or not to reserve such a time-slot by selecting "no".

If the trucking operator selects "yes" indicating a desire to provisionally reserve a supplementary time-slot for a drive-full operation, reservation system 40 displays the Available Time-slots page (FIG. 3C). Analogous to the described above for reservation of a supplementary time slot for a two-moves operation, the trucking operator selects a suitable available time-slot if such exists. When the originally-reserved time-slot is for export (delivering a full container to the terminal for a shipper) a suitable time-slot for a drive-full operation is any time-slot later than, preferably immediately following and contiguous with, the later of the originally reserved time-slot and, if such exists, a supplementary time-slot reserved for a two-moves operation. When the originally reserved time-slot is for import (picking-up a full container from the terminal for delivery for a shipper) a suitable time-slot for a drive-full operation is any time-slot earlier than, preferably immediately prior to and contiguous with, the earlier of the originally reserved time-slot and, if such exists, a supplementary time-slot reserved for a two-moves operation.

Reservation system 40 stores the newly provisionally reserved drive-full time-slot associated with the originally reserved time-slot but with an own time-slot reservation number, and displays the time-slot Reservation page (FIG. 3D).

The reservation is provisional, and depending on the embodiments, may be valid for only a limited time.

To finalize the reservation of the provisionally reserved supplementary time-slot, the trucking operator must have the details of the container to be shipped in the drive-full operation. In some instances, the trucking operator has the details available during the initial reservation. In some instances, the trucking operator first provisionally reserves a supplementary time-slot, contacts potential customers, and finalizes the reservation only after a customer actually agrees to make use of the supplementary time-slot and provides the shipment details to the trucking operator.

To actually finalize the reservation of the provisionally reserved supplementary time-slot, whether during an initial reservation or subsequently during amendment of details of an existing reservation, the trucking operator indicates a desire to enter details in field 98 (FIG. 3D). Reservation system 40 displays a Supplementary Time-Slot Reservation page (FIG. 3G).

It is important to note that in the specific embodiment described herein, reservation of a supplementary time-slot for a drive-full operation is described following the description of the reservation of a time-slot for a two-moves operation. Generally, a reservation system as described herein is configured to allow reservation of a supplementary time-slot for a drive-full operation independently (before or after) and unrelated to reservation of a time-slot for a two-moves operation.

Since in the specific embodiment discussed, reservation of a supplementary time-slot for a drive-full operation follows the reservation of a supplementary time-slot for a two-moves operation, Supplementary Time-Slot Reservation page (FIG. 3G) resembles Supplementary Time-Slot Reservation Page (FIG. 3F) and includes, for the drive-full supplementary time-slot, the reservation number 62, the date 64, commencement time 66 and relationship to the originally reserved time-slot 108 (two-moves or drive-full, import or export).

Also displayed are the details of the originally reserved time slot, including the reservation number 110*a*, the type of activity for which the time-slot is reserved 110*b* (import for a consignee or export for a shipper), and the date 110*c* and commencement time 110*d* of for the originally-reserved time-slot, as well as the details of the supplementary time slot reserved for the two-moves operation, including the reservation number 112*a*, the type of activity for which the time-slot is reserved 112*b*, and the date 112*c* and commencement time 112*d* of the supplementary time-slot reserved for the two-moves operation. Additional information that is known from that of originally reserved time-slot and is automatically filled-in includes the type of activity 68, for which the time-slot is reserved which is set opposite to the type of activity of the originally reserved time-slot, the license number 84 of the truck destined to pick-up the container from the terminal, the driver contact data 86, and the driver's identity 88. Analogously to the described above, the trucking operator enters further required information in the appropriate fields and selects the appropriate choices. Specifically in the depicted embodiment, the trucking operator enters the internal reference number 70 of the supplementary time-slot used by the trucking operator, enters the booking order number 72 received from the shipping company, the shipping line 74, the vessel name 76 and voyage number 78 on which the full container is to be lifted, the type of container (20' or 40') 80, the container number 82, the identity of the shipper 90, and the customer location 92 from which the container is to be picked-up.

Substantially as described above, if the trucking operator indicates that the container type is 20', reservation system 40 provides the trucking operator with the choice to reserve an additional supplementary time-slot for a two-moves operation in field 98. Such a reservation is performed substantially as described above.

Substantially as described above, reservation system 40 provides the trucking operator with the choice to edit the default warning message schedule in field 94.

After all the required details are entered, the trucking operator indicates a desire to finalize the reservation of the supplementary time-slot by selecting field 100. Reservation system 40 stores the entered data in the database and displays the Task Menu page (FIG. 3B). In preferred embodiments, reservation system 40 subsequently sends the trucking operator (and in some embodiments, also the shipper entered in field 90 and/or to the truck driver contact data in field 86) an additional confirmation of the reservation, preferably including all the entered details.

Reserving a Two-Moves for a Drive Full Operation

As noted above, if during reservation of a supplementary time-slot for a drive-full operation the trucking operator indicates that the container type is 20' in field 80 (FIG. 3G) then reservation system 40 provides the trucking operator with the choice, in field 98, to provisionally reserve an additional supplementary time-slot for a two-moves operation by selecting "yes" or not to reserve such a time-slot by selecting "no". Reservation of a supplementary time-slot for a two-moves operation related to a reserved supplementary time-slot for a drive-full operation is substantially the same as described above.

Subsequent cancellation or amendment of any supplementary drive-full time-slot may be performed substantially as described above. In some embodiments, canceling an originally reserved time-slot leads to cancellation of all related supplementary time-slots. In some embodiments a trucking operator may cancel the original reservation, and retain one or more reserved supplementary time-slot.

Reserving a Time-Slot for Import a Consignee

In the specific embodiment discussed above with reference to FIG. 3C, a trucking operator begins reservation of one or more time-slots by reserving a time-slot for delivery of a full container to a terminal for a shipper. In some embodiments, a trucking operator begins reservation of one or more time-slots by reserving a time-slot for pick-up of a full container from a terminal for delivery for a consignee.

About 2-4 days before vessel 16 docks carrying a specific full container destined for import, the customs broker assigned by the consignee receives a "notice of arrival" notifying of the imminent arrival of vessel 16. After vessel 16 docks, the full container is lifted-off vessel 16 and placed on inbound stack 20. The customs broker clears the full container through customs and provides the consignee with a delivery order. In some instances, the custom procedure begins as soon as "notice of arrival" is received (e.g., 2-4 days prior to docking).

The full container must be picked-up from inbound stack 20 and removed from terminal 10 within a 4-day period from unloading, or "touch down" of the container, that is to say prior to the last free day for pick up, to avoid payment of heavy fines.

The consignee contacts a trucking operator (e.g., by telephone, through a text-dialogue system) to coordinate the pick-up of the full container from inbound stack 20, preferably as soon as possible, preferably prior to the last free day for pick up, and the delivery of the full container to a designated location of the consignee, preferably at a time which is convenient for the consignee.

Substantially as described above with reference to reserving a time-slot for a shipper using the teachings herein, the trucking operator reserves a time-slot for the consignee on a time-slot Reservation page (FIG. 3D), with the required changes, e.g., "import" in field 68, the delivery order number in field 72 and Consignee name in field 90.

As is appreciated by a person skilled in the art, in some embodiments the teachings herein allow the reservation of between one and four time-slots for a single truck to perform between one and four operations in the terminal in a single trip to a terminal. In some embodiments, in a given reservation for a given trip of given truck to a terminal, a trucking operator can reserve zero, one, or two time-slots for delivery of a full container to a terminal for a shipper. In some embodiments, additionally or alternately, in a given reservation for a given trip of a given truck to a terminal, a trucking operator can reserve zero, one, or two time-slots for loading of a full container at the terminal for delivery to a consignee.

As noted above, reservation system 40 provides the trucking operator with the choice to edit the default warning message schedule in field 94. In some embodiments, a time-slot and one or more supplementary time-slots have the same warning message schedule. In some embodiments, a time-slot and/or one or more supplementary time-slot have separate warning message schedules that may be the same or may be different.

Depending on the specific embodiment, a reservation system such as reservation system 40 may require more, less, and/or different information to originally reserve a time-slot and/or to reserve a supplementary time-slot than the specific embodiment discussed hereinabove. In some embodiments, entry of some or all required information is mandatory to finalize a time-slot reservation. In some embodiments, entry of some information is optional. In some embodiments, entry of some information is mandatory, but the information may be entered at a later date, after a reservation has been finalized.

Truck Access to the Terminal

As noted in the introduction, a truck driver beginning a trip to a prior art terminal 10 without the benefits of the teachings herein, must plan to arrive at the terminal as early as possible and at inconvenient hours in order to wait an unknown, but long, time in a queue.

In accordance with the teachings herein, the driver of a truck intending to arrive at terminal 34 has a reserved time-slot and so can plan the work day in a rational and efficient way. Instead of waking up early in an often vain attempt to complete delivery of a container within a single work day, the driver can wake when convenient, or can decide to sleep in a convenient hotel or motel.

A truck driver picking-up a full container from terminal 34 for delivery to a consignee is able to start the work day as late as possible to arrive in time for the reserved time-slot, in some instances avoiding driving during rush hour. If there is a delay in the time-slot, the driver may even be able to delay the beginning of the work day. In either case, the chance increases that the delivery can be performed within a single work day and the driver will not be required to park the truck for a legally mandated rest.

A truck driver intending to deliver a full container to terminal 34 from a shipper is able to plan the work day efficiently to arrive at the terminal in time for the scheduled time-slot, including picking up a semitrailer (in the case of a semi-trailer truck), picking up an empty container (or two empty 20' containers for a scheduled two-moves operation) from a container depot, arriving at a location designated by the shipper for stuffing the container (or two containers and/or two locations, designated by the shipper or shippers for stuffing the two 20' containers for a scheduled two-moves operation). After the container is (or containers are) stuffed and sealed, and while the customs broker is advised to prepare the export documents required for shipment of the container or containers, the truck-driver proceeds to drive to terminal 34.

As a truck driver drives to a terminal 34, whether to deliver a container or to pick-up a container, the driver receives warning messages in accordance with the warning message schedule associated with the reserved time-slots. If there is a significant delay or if there is a possibility of earlier service, for example because of another truck being delayed or because of the terminal happening to work more efficiently, the truck driver receives a warning message and may act accordingly, for example, attempting to arrive earlier than scheduled to take advantage of earlier available time-slots, or changing plans in case delays mean that the reserved time-slot is delayed.

The truck driver's actions upon arrival in the environs of terminal 34 are dependent on how early the arrival is.

Typically, the driver arrives earlier than the commencement time of the reserved time-slot. The driver proceeds to park the truck in a waiting area 46 so as to not obstruct traffic into terminal 34. The truck driver is free to turn the truck motor off, leave the truck, rest, eat or find entertainment.

Two time-slots before being allowed to enter terminal 34 for service, reservation system 40 invites the truck driver to bring the truck into a specific lane 26 of a specific gate 28. The invitation is by sending a warning message through the driver contact data and/or by indicating such on a sign board such as 42.

The driver receives the invitation and has sufficient time to bring the truck to a penultimate position 47 in the proper lane 26 of the proper gate 28 behind a single preceding truck in a position 48 just before the entrance to terminal 34.

After the preceding truck enters terminal 34, reservation system 40 informs the truck driver to advance the truck to position 48 just before the entrance to terminal 34, e.g., by sending a warning message through the driver contact data and/or by indicating such on a sign board such as 42. The truck driver advances the truck to position 48. The truck-identifier 44 associated with the lane 26 identifies the truck and provides the identity to terminal control system 38. Terminal control system 38 receives from reservation system 40 the identity of the next truck scheduled to enter terminal 34 through the lane 26 of the gate 28. If there is a discrepancy between the scheduled truck and the truck that is actually waiting, terminal control system 38 indicates such and terminal personnel are asked to resolve the situation.

If there is no discrepancy between the scheduled truck and the truck that is actually waiting, terminal control system 38 retrieves from reservation system 40 the task or tasks required for servicing the truck, for example, the size of the full container or containers to be moved, the locations of the container or containers to be moved (that is to say, which of stacks 20 and 22, and where exactly in the stacks), and whether a two-moves or drive-full operation is to be performed. Such knowledge allows terminal 34 and personnel thereof to efficiently prepare for servicing of a truck, especially allocation and prepositioning of personnel and materiel.

Additionally, if there is no discrepancy between the scheduled truck and the truck that is actually waiting, when terminal 34 is able to service the truck, control system 38 opens the physical barrier. The truck passes the barrier, which is subsequently closed. The truck proceeds within terminal 34 in the usual way to be serviced. When servicing is complete, the truck leaves terminal 34 through exit 32.

In some embodiments, when a two-moves or drive-full operation is to be performed, after one of the multiple operations is performed, the truck leaves terminal 34 through exit 32 and returns to a waiting area 46 to wait for further handling substantially as described above, without waiting in a first-in first-out queue.

In some embodiments, when a two-moves or drive-full operation is to be performed, especially when the time-slot for a following operation is contiguous with the time-slot of a preceding operation, the truck is directed to a location inside terminal 34 to perform the following operation without leaving terminal 34.

The teachings herein have a number of advantages.

In some embodiments, the teachings herein lead to a reduction of truck traffic in the vicinity of the terminal with the concomitant advantages, including reduction of air pollution and truck fuel usage.

In the art, a terminal operator knows which specific truck is to be serviced at the terminal only when the truck actually passes into the terminal. In some embodiments of the teachings herein, the terminal operator has clear schedule of which specific truck is to be serviced at which point in time, and how that truck has to be serviced, potentially allowing a more efficient use of resources in the terminal.

In some embodiments, the greater efficiency allows reduction of the size of a terminal, of a workforce of a terminal, and/or increases terminal capacity.

In some embodiments, consignees have a better idea when a truck will deliver goods from the terminal, reducing uncertainty and costs.

In some embodiments, a driver picking-up a full container from a terminal for delivery to a consignee starts the work day close to commencement of a reserved time-slot and is able to complete delivery of the goods the same day without exceeding the legal limit of driving hours.

In some embodiments, customers (both shippers and consignees) are able to select a more convenient time for delivery of goods from a terminal or pick-up of goods from the customer location for transport to a terminal.

As trucks are not required to wait in a queue for service at a terminal, the use of trucks is more efficient in terms of time and/or fuel and/or pollution and/or drivers. This is especially significant due to legal limitations on the number of consecutive hours a truck driver is allowed to drive. The teachings herein allow a driver to begin a work day to make maximal use of the day without using, or wasting, a significant portion of the day waiting in a queue.

In some embodiments, a driver is able to wait for a reserved time-slot not in a queue at the terminal, but in a location nearby the terminal that is more suitable for resting, for example, a hotel or motel.

In addition to allowing truck drivers to rest or sleep more, some embodiments of the method allow drivers to perform other tasks during time that is no longer wasted waiting in a queue to enter a terminal. Such a task may for example be to bring an empty container from a customer to a container depot. In this context, it is important to remember that terminals do not handle empty containers, only full containers loaded with goods. Truck capacity is required to take empty containers from a customer to a container depot, and from a container depot to a customer for stuffing. In some embodiments, the truck time created by reducing waiting times at a terminal becomes available for the performance of such tasks.

As noted above, in some embodiments, the teachings herein allow the reservation of one to four time-slots for a single truck to perform one to four operations in the terminal during a single trip thereto. In some embodiments, when two or more contiguous time-slots are reserved for two or more operations, the truck is allowed to stay in the terminal to perform those two or more operations without leaving the terminal, increasing efficiency. In some embodiments, when two or more time-slots, contiguous or not, are reserved for two or more operations, the truck is required to exit the terminal between two operations and to reenter the terminal at the arrival of the second or subsequent time-slot, typically for reasons of traffic flow or security. Since the truck is allowed to reenter the terminal at a reserved time-slot without waiting in a queue, efficiency is increased.

It is important to note, that implementation of the teachings herein affects how the small-scale transport stream (the trucks) of a terminal are handled, but in some embodiments the handling of the larger-scale transport stream 12, the vessels, is substantially unaffected and functions as known in the art, such as described in the introduction hereinabove with reference to terminal 10. Specifically, containers are loaded and unloaded from vessels 16 and moved to an inbound stack 20 and a transit stack 24 and/or from an outbound stack 22 and a transit stack 24.

The specific embodiment discussed above with reference to FIG. 3, describes a reservation system 40 where a trucking operator gains access to a single terminal in a single port. In some embodiments, especially when a single terminal operator operates several terminals and/or ports, a reservation system is configured to implement the teachings herein for more than one terminal and/or more than one port. In some such embodiments, when a vessel is diverted for any reason to a different terminal or port, all the necessary information for reserving time-slots and canceling reserved time-slots remains available from the same website.

Real-Time Conversation to Reserve Time-Slots

In the embodiment discussed above, a trucking operator accesses the reservation system and database and reserves a time-slot while maintaining a real-time conversation with the customer (consignee or shipper). This allows efficient negotiation and decision-making under the pressure of the short time available for reserving a time-slot. In some alternative embodiments, the trucking operator receives a message from a customer (e.g., telephone text message, email message, fax message) requesting that the trucking operator reserve a time-slot, the trucking operator accesses the reservation system and database to reserve a time-slot substantially as discussed above but without maintaining a conversation with the customer, and informs the customer of a reserved time-slot only after the time-slot is actually reserved. In some embodiments, the trucking operator maintains a computerized communication system (typically via a website in the Internet) that allows at least some customers to reserve a time-slot automatically. Such a system typically accepts a container delivery time or a container pick-up time from the consignee or shipper respectively, identifies a travel time between the customer location and the terminal (e.g., using a look-up table, using a travel-time calculator known in the art of electronic navigation systems), identifies an available truck and driver (e.g., by interrogating a truck and/or driver roster), automatically identifies potentially suitable available time-slots in the database, provides a choice of available time-slots to the customer for selection, and upon receipt of the customer selection, reserves the selected time-slot.

Two-Moves and Drive-Full Operation

In some embodiments discussed above, performance of a supplementary operation such as a two-moves operation or a drive-full operation is possible, but requires reserving a separate time-slot for each operation to be performed. In order to allow greater efficiency, in some embodiments, time-slots for performance of a supplementary operation may be provisionally reserved, giving a trucking operator the opportunity to coordinate a supplementary operation with one or more prospective customers (shipper and/or consignee).

In some embodiments, it is not possible to provisionally reserve a time-slot for a supplementary operation. Rather, reservation of a time-slot for a supplementary operation is substantially the same as for a non-supplementary operation, and requires, for example, identification of specific designated container or containers (for example, including container type and identification) to be transported during the supplementary operation. Such embodiments typically require that the trucking operator coordinate with more than one prospective client prior to, or during, reservation of the time-slots.

In some embodiments, there is no need for any reservation of a time-slot for a supplementary operation. A trucking operator reserves a single time-slot for a truck and the truck driver is allowed to use the time-slot for supplementary operations, in some embodiments up to one supplementary operation, in some embodiments up to two supplementary operations, and in some embodiments up to three supplementary operations.

For example, a trucking operator reserves a time-slot (substantially as described above) for delivery of a first specific 20' container from a shipper to the terminal. If the truck arrives loaded with a second 20' container, the truck is allowed to enter the terminal based on the reserved time-slot for delivery of the first 20' container to an outbound stack 22 of the terminal. Upon presentation of the booking number for the second 20' container, the driver is allowed to deliver the second container to an outbound stack 22. Upon presentation of one (or two) delivery orders, the driver is allowed to load a respective container (or two respective 20' containers) from an inbound stack 20 for delivery from the terminal to a consignee.

For example, a trucking operator reserves a time-slot (substantially as described above) for loading a first container from an inbound stack 20 for delivery from the terminal to a consignee. If the truck arrives loaded with one (or two 20') containers and respective booking numbers, the driver is allowed to deliver the container (or two containers) to an outbound stack 22. Further, if the driver presents a second delivery order, the driver is allowed to load a second container from an inbound stack 20 for delivery from the terminal to a consignee Trade in Reserved Time-Slots In the embodiments described above, a time-slot is effectively irrevocably reserved for movement (lift on/lift off) of a specific and designated container in the terminal. In some embodiments, the reservation system is configured to allow operations reserved for two time-slots to be swapped upon agreement by the respective trucking operators. In some such embodiments, during or after reservation of a time-slot, a trucking operator is allowed to designate that a reserved time-slot is fixed (swapping is not negotiable) or flexible (swapping is negotiable). In some such embodiments, the fact that a reserved time-slot is flexible is displayed, for example in a respective "Available Time-Slots" page.

For example, a first trucking operator reserves an available time-slot substantially as described above that is not ideal for either or both the first trucking operator and the customer. Subsequently, the first trucking operator studies the reserved time-slots that are designated as being flexible and, if such a time-slot is at a preferred time, contacts the second trucking operator who has reserved the preferred time-slot. The second trucking operator can then choose for exchange time-slots, for free or for consideration (e.g., cash payment). In some such embodiments, the reservation system is configured to facilitate such exchange or trade, for example, by allowing establishment of a communication route such as text message, voice message or letter, between the two trucking operators.

For example, a first trucking operator reserves an available time-slot substantially as described above, and wishes to reserve a supplementary time slot for a two-moves operation or for a drive-full operation, but a suitable supplementary time slot is not readily available. Subsequently, the first trucking operator studies the reserved time-slots that are designated as being flexible and, if such a time-slot is at a preferred time more suitable to be used as the supplementary time-slot, contacts the second trucking operator who has reserved the preferred time-slot. The second trucking operator can then choose for exchange time-slots, for free or for consideration (e.g., cash payment). In some such embodiments, the reservation system is configured to facilitate such exchange or trade, for example, by allowing establishment of a communication route such as text message, voice message or letter, between the two trucking operators.

Pre-Reservation of Time-Slots for Consignees

It is clear that in some instances, shippers (who transport full containers to a terminal) have an advantage over consignees (who transport full containers from a terminal) in selecting time-slots. Specifically, as shippers can reserve time-slots 3-4 days early while consignees can reserve time-slots only 1-2 days early, it is possible that a trucking operator trying to reserve a time-slot for a consignee finds that there are no suitable time-slots available. To avoid such an occurrence, some embodiments of a method as described herein include a mechanism to prevent shippers from reserving all preferred time-slots, for example by pre-reserving some (e.g., a certain percentage) of time-slots for consignees only.

In some embodiments, a certain predetermined number of time-slots is pre-reserved for consignees only, and another predetermined number of time-slots is pre-reserved for shippers only. The ratio of shipper to consignee pre-reserved time-slots is determined by the terminal operator, for example, based on experience, based on the specific vessels scheduled to arrive/depart from the terminal on a specific date, or based on information received from shippers and consignees well-before vessel arrival at a terminal.

In some embodiments, each time a time-slot is reserved by a shipper, some number of similar time-slots (e.g., an identical or a similar number) is pre-reserved for consignees only, typically, but not necessarily, one time-slot being pre-reserved for a consignee for each time-slot reserved by a shipper. It is important to note that such pre-reservation of time-slots for consignees only does not engender inefficiency. The inherent uncertainty in scheduling caused by traffic as well as technical and other delays allows substantially all time-slots to be utilized, for example by dynamic rescheduling as described above.

Wireless Communication

As discussed above, embodiments of the teachings herein require that the terminal operator and/or the reservation system be able to send wireless notifications to individual truck drivers, specifically, allowing warning communications regarding a reserved time-slot to be sent to a truck driver. The methods and devices used for wireless notification may be any suitable methods and devices. For example, in some embodiments, notification is with voice messaging or text messaging. For example, in some embodiments, notification is through the Internet or through a telephony network, for example, using a cellular telephone, a smartphone, or another wireless communication device. Currently, it is common for truck drivers to have cellular telephones and other wireless electronic communication devices that allow Internet access. Thus, in typical embodiments, no special or dedicated hardware is required to reserve a time-slot or to receive messages.

Access to Database

As discussed above, in some embodiments, the reservation system and database are maintained on an Internet-accessible server, and the reservation system is accessed by a trucking operator through the Internet. In some embodiments, the database is additionally or alternatively accessible through other routes, for example, communication is through a telephone and the database is configured to accept information related to reservation of time-slots with commands input using a telephone keypad and relayed over a telephone line (wireless, cellular and/or physical) as is known in the art.

For example, as an alternative to using Internet access to reserve and cancel reservation of a time-slot, substantially the same operation can be performed by a telephone without Internet access. For example, on calling into a dedicated phone line, a series of questions may be put to the caller (e.g., the trucking operator), that are answered using the numerical keypad of the telephone. By suitable programming of the telephone answering system, the caller may communicate data electronically to the reservation system without the need for human intervention.

Types of Terminals

The teachings herein are applicable to terminals that provide transloading with trucks, including road-sea terminals for transloading between trucks and ships, road-rail terminals for transloading between trucks and trains, road-air terminals for transloading between trucks and aircraft, road-road terminals (e.g., depots, warehouses, logistic centers) for transloading between trucks, typically after a period of storage. That said, the teachings are especially useful for road-sea terminals, where the combination of factors such as the scale of goods transported, the uncertainty of ship arrival times, the difference in capacity between trucks and ships, limited loading/unloading assets, and delays caused by traffic, weather, and technical difficulties render rational scheduling practically impossible.

Types of Goods

The teachings herein are applicable to all manners of goods, but especially to containerized goods and to bulk goods (goods transported loose and unpacked and traded by weight), such as grain, minerals, scrap metal, gravel, ores and the like.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method of traffic flow management at a terminal, comprising:
    establishing a remotely-accessible reservation system implemented using software running on suitable hardware comprising a database of time-slots for servicing trucks at the terminal, each of said time-slots being not more than about 30 minutes long;
    populating an available time-slot portion of said database with a plurality of time-slots available for servicing trucks at said terminal, based on at least one criterion of said terminal;
    reserving at least one of said plurality of time-slots for servicing of a specific truck of said trucks at said terminal, by removing said at least one of said plurality of time-slots from said available time-slot portion and by moving said at least one of said plurality of time-slots to an unavailable time-slot portion of said database; and in said database, associating with said at least one of said plurality of time-slots information related to at least one of said specific truck and a service to be performed on said specific truck;

wherein said reservation system is remotely-accessible to trucking operators for reserving a time-slot for a truck to be serviced at a terminal and is also remotely-accessible to truck drivers to receive communications about a reserved time-slot;

the method further comprising:

updating a user in communication with said specific truck of a change in said reserved at least one time-slot as information regarding said change becomes available; and a user in communication with said specific truck notifying said database of a delay in arrival of said specific truck at said terminal, in real-time;

wherein trucks enter said terminal through a lane associated with a truck-identifier device and a moveable physical barrier having two states: an open state allowing passage of a truck therethrough and a closed state preventing passage of a truck therethrough, said truck-identifier device functionally associated with a terminal control computing system of said terminal and configured to provide said terminal control computing system with the identity of a leading truck in said lane, and further comprising:

said truck-identifier device identifying a truck in said lane at a position behind said barrier just before an entrance to said terminal and providing said identity to said terminal control computing system;

determining that there is no discrepancy between said identified truck and a specific truck scheduled to enter said terminal through said lane according to said reservation system; and said terminal control computing system opening said physical barrier, allowing said identified truck to enter said terminal;

wherein the truck-identifier device is selected from the group consisting of a license plate number reader, a wireless receiver, and an RFID reader.

2. The method of claim 1, wherein said service to be performed on said specific truck comprises at least one of:

lifting at least one full container off an inbound stack at said terminal and loading said at least one full container onto said specific truck; and unloading at least one full container from said specific truck and lifting said at least one full container onto an outbound stack at said terminal.

3. The method of claim 1, wherein said reserving comprises remotely reserving said at least one of said plurality of time-slots using a remote communication device comprising a remote phone and/or remote computing device.

4. The method of claim 1, also comprising updating in said database information associated with said at least one reserved time-slot.

5. The method of claim 1, also comprising sending a driver of said specific truck at least one notification reminding said driver of an upcoming reserved time-slot.

6. The method of claim 5, wherein said sending comprises sending said driver at least three said notifications reminding said driver of said upcoming reserved time-slot.

7. The method of claim 5, wherein said sending comprises sending said at least one notification at a time indicated by a user associated with said specific truck, which time is stored in said database in association with said upcoming reserved time-slot.

8. The method of claim 1, wherein said reservation system is also remotely-accessible to truck drivers to send communications about a reserved time-slot.

9. The method of claim 1, thereby enabling coordinated rescheduling of available time-slots.

10. The method of claim 1, said reservation system configured to allow reservation of two time-slots to service a single truck, thereby allowing implementation of a drive-full operation.

11. The method of claim 1, wherein each said lane is also associated with an electronic signboard that is functionally associated with said reservation system, configured to receive from said reservation system identifiers of trucks designated to enter said terminal through an associated lane, and to display said identifiers.

12. A terminal management device for managing traffic flow at a terminal, comprising:

a remotely-accessible reservation system implemented using software running on suitable hardware comprising a database of time-slots for servicing trucks at the terminal, said database comprising an available time-slot portion and an unavailable time-slot portion, each of said time-slots being not more than about 30 minutes long;

a database population module implemented using software running on suitable hardware for populating said available time-slot portion with a plurality of time-slots available for servicing trucks at said terminal, based on at least one criterion of said terminal;

a time-slot reservation module implemented using software running on suitable hardware for reserving at least one of said plurality of time-slots for servicing of a specific truck of said trucks at said terminal, by removing said at least one of said plurality of time-slots from said available time-slot portion and by moving said at least one of said plurality of time-slots to said unavailable time-slot portion; and a database updating module implemented using software running on suitable hardware for associating, in said database, said reserved at least one of said plurality of time-slots with information related to at least one of said specific truck and a service to be performed on said specific truck;

wherein said reservation system is remotely-accessible to trucking operators for reserving a time-slot for a truck to be serviced at a terminal and is also remotely-accessible to truck drivers to receive communications about a reserved time-slot;

wherein said time-slot reservation module comprises a transceiver, for receiving communications sent from a remote communication device, comprising a remote phone and/or remote computing device, for remotely reserving said at least one of said plurality of time-slots; and also comprising:

a receiver for receiving, from a user in communication with said specific truck, a notification of a delay in arrival of said specific truck at said terminal, in real-time;

the terminal management device further comprising a terminal control computing system of said terminal, wherein trucks enter said terminal through a lane associated with a truck-identifier device and a moveable physical barrier having two states: an open state allowing passage of a truck therethrough and a closed state preventing passage of a truck therethrough;
the truck-identifier device;
the moveable physical barrier;
said truck-identifier device functionally associated with said terminal control computing system and configured to identify a truck in said lane at a position behind said barrier just before an entrance to said terminal and providing the identity of the identified truck to said terminal control computing system; and
said terminal control computing system configured to open said physical barrier, allowing said identified truck to enter said terminal if there is no discrepancy between the identified truck and a specific truck scheduled to enter said terminal through said lane according to said reservation system, said terminal control computing system opening said physical barrier, allowing said identified truck to enter said terminal;
wherein the truck-identifier device is selected from the group consisting of a license plate number reader, a wireless receiver, and an RFID reader.

13. The terminal management device of claim 12, wherein said service to be performed on said specific truck comprises at least one of:
lifting at least one full container off an inbound stack at said terminal and loading said at least one full container onto said specific truck; and
unloading at least one full container from said specific truck and lifting said at least one full container onto an outbound stack at said terminal.

14. The terminal management device of claim 12, also comprising a communication module implemented using software running on hardware for updating a user in communication with said specific truck of a change in said reserved at least one time-slot as information regarding said change becomes available.

15. The terminal management device of claim 12, also comprising an information updating module implemented using software running on hardware for updating, in said database, information associated with said at least one reserved time-slot.

16. The terminal management device of claim 12, also comprising a notification sending module implemented using software running on hardware for sending a driver of said specific truck at least one notification reminding said driver of an upcoming reserved time-slot.

17. The terminal management device of claim 16, wherein said notification sending module is configured for sending said driver at least three said notifications reminding said driver of said upcoming reserved time-slot.

18. The terminal management device of claim 16, wherein said notification sending module is configured for sending said at least one notification at a time indicated by a user associated with said specific truck, which time is stored in said database in association with said upcoming reserved time-slot.

19. The terminal management device of claim 12, wherein said reservation system is also remotely-accessible to truck drivers to send communications about a reserved time-slot.

20. The terminal management device of claim 12, thereby enabling coordinated rescheduling of available time-slots.

21. The terminal management device of claim 12, said reservation system configured to allow reservation of two time-slots to service a single truck, thereby allowing implementation of a drive-full operation.

22. The terminal management device of claim 12, wherein each said lane is also associated with an electronic signboard that is functionally associated with said reservation system, configured to receive from said reservation system identifiers of trucks designated to enter said terminal through an associated lane, and to display said identifiers.

* * * * *